(12) United States Patent
Stare et al.

(10) Patent No.: US 11,808,870 B2
(45) Date of Patent: Nov. 7, 2023

(54) POSITION DETERMINATION USING TIME DIFFERENCE OF ARRIVAL OF SINGLE FREQUENCY NETWORK SIGNALS

(71) Applicant: Telefonaktiebolaget LM Ericsson (publ), Stockholm (SE)

(72) Inventors: Erik Stare, Sollentuna (SE); Sara Modarres Razavi, Linköping (SE); Fredrik Gunnarsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 260 days.

(21) Appl. No.: 17/290,570

(22) PCT Filed: Nov. 4, 2019

(86) PCT No.: PCT/SE2019/051110
§ 371 (c)(1),
(2) Date: Apr. 30, 2021

(87) PCT Pub. No.: WO2020/091686
PCT Pub. Date: May 7, 2020

(65) Prior Publication Data
US 2021/0373116 A1  Dec. 2, 2021

Related U.S. Application Data

(60) Provisional application No. 62/755,066, filed on Nov. 2, 2018.

(51) Int. Cl.
*H04W 24/00* (2009.01)
*G01S 5/02* (2010.01)
(Continued)

(52) U.S. Cl.
CPC .......... *G01S 5/0205* (2013.01); *G01S 1/0428* (2019.08); *H04W 64/003* (2013.01); *H04B 17/336* (2015.01)

(58) Field of Classification Search
CPC ............................. G01S 5/0205; G01S 1/0428
See application file for complete search history.

(56) References Cited

U.S. PATENT DOCUMENTS

2016/0134402 A1* 5/2016 Park .................... H04L 27/2663
370/329

OTHER PUBLICATIONS

Thevenon, P. et al., "Positioning principles with a mobile TV system using DVB-SH signals and a Single Frequency Network", 2009 16th International Conference on Digital Signal Processing, Jul. 5, 2009, pp. 1-8, IEEE.
(Continued)

*Primary Examiner* — Justin Y Lee
(74) *Attorney, Agent, or Firm* — COATS & BENNETT, PLLC

(57) ABSTRACT

The disclosure relates to an OTDOA positioning technique wherein different base stations transmit different variations of the same basic PRS or other positioning signal synchronously as an SFN signal to effect an observed time shift at the UE between the different variations of the basic PRS signal or positioning signal. This added time shift resulting from the transmission of different variations by different base stations effectively spreads the corresponding channel impulses in the CIR of the SFN signal in the time domain so that the UE is better able to detect and discriminate between different instances of the positioning signal transmitted from different base stations.

20 Claims, 26 Drawing Sheets

(51) Int. Cl.
*G01S 1/04* (2006.01)
*H04W 64/00* (2009.01)
*H04B 17/336* (2015.01)

(56) References Cited

OTHER PUBLICATIONS

Yan J., "A Base Station Identification Algorithm for SFN Positioning System in NLOS Environment", 2013 IEEE 78th Vehicular Technology Conference (VTC Fall), Sep. 2, 2013, pp. 1-5, IEEE.

* cited by examiner

POSITION DETERMINATION USING TIME DIFFERENCE OF ARRIVAL OF SINGLE FREQUENCY NETWORK SIGNALS

RELATED APPLICATIONS

This application claims priority to U.S. Provisional Application No. 62/755,066, filed 2 Nov. 2018, disclosure of which is incorporated in its entirety by reference herein.

TECHNICAL FIELD

The present disclosure relates generally to methods and apparatus for determining the position of a user equipment (UE) in a wireless communication network and, more particularly, to methods and apparatus that use time difference of arrival (TDOA) measurements for position determination.

BACKGROUND

User equipment (UE) positioning is recognized as an important feature for Long Term Evolution (LTE) and New Radio (NR) networks due to its potential for commercial applications (for example intelligent transportation, entertainment, industry automation, robotics, remote operation, healthcare, smart parking, and so on) as well as its relevance to United States Federal Communication Commission (FCC) E911 requirements.

A number of different positioning techniques are considered for LTE/NR networks. These techniques include Enhanced Cell Identification (Enhanced Cell ID), Assisted Global Navigation Satellite System (A-GNSS), Observed Time Difference Of Arrival (OTDOA), and Uplink Time Difference Of Arrival (UTDOA). The Enhanced Cell ID approach uses cell identification (Cell ID) information to associate the UE to the serving area of a serving cell, and then additional information is used to determine a finer granularity position. In the A-GNSS approach, GNSS information is retrieved by the UE and is supported by assistance information from the network, e.g. from a location server. The OTDOA and UTDOA approaches both use triangulation techniques to determine the location of the UE. In OTDOA, the UE estimates the time of arrival for reference signals transmitted from different time-synchronized base stations. The position of the UE can then be determined by the UE, or by a location server in the network, based on the differences between the arrival times of the reference signals. In UTDOA, the UE transmits a reference signal on the uplink that is received at different time synchronized base stations. The position of the UE can then be determined by a location server in the network based on the differences between the arrival times of the reference signal at different base stations.

In the case of OTDOA, the UE receives positioning signals transmitted at the same time from at least three base stations or other transmission points with known geographical locations. The positioning signals may comprise dedicated Positioning Reference Signals (PRSs) that are known a priori to the UE or other known reference signals, such as Channel State Information (CSI) signals, Cell-Specific Reference Signals (CRSs), or Demodulation Reference Signals (DMRSs) that are used for positioning as well as for other purposes. The OTDOA of the positioning signals is determined by pairwise comparison of the channel impulse responses (CIRs) associated with the positioning signals. The CIRs are obtained by correlating the received positioning signals with the known positioning signals. The results of the OTDOA values may be used by the UE or the network to estimate the UE's position.

The accuracy of the position estimates depends to a large extent on the quality of the OTDOA values. The Signal-to-Interference plus Noise Ratio (SINR) of the received positioning signal affects the quality of the OTDOA value. A positioning signal with high SINR will provide a more accurate estimate of the CIR and thus allow for more accurate position estimation than a reference signal with a low SINR. A potential source of interference when estimating a CIR from one base station is the received positioning signals from other base stations.

One way of reducing such interference is to allow different, especially adjacent, base stations to transmit orthogonal PRSs. In Orthogonal Frequency Division Multiplexing (OFDM) systems, orthogonality of the PRSs may naturally be achieved by using different (non-overlapping) sets of resource elements (REs) in an OFDM symbol for the PRSs originating from different base stations.

To keep latency and/or overhead limited, some base stations in a network may need to use overlapping sets of REs, so that some REs are used by more than one base station. This reuse of the REs for PRSs transmitted by different base stations introduces a degree of interference when a UE receives signals from several base stations on the same REs. There is a trade-off between latency and overhead on the one hand and the degree of interference on the other hand.

Overlapping REs are typically introduced in a systematic way by applying a frequency reuse technique, e.g., reuse-6 for LTE/NR PRS. This means that adjacent base stations are typically received with orthogonal PRSs, but base stations located farther away, where the same REs are reused, are received with interference since they are non-orthogonal. To reduce the negative impact of such interference, some form of coding may be applied to non-orthogonal PRSs so that the effect of the interference is noise-like.

Non-orthogonal PRSs (e.g., on overlapping REs) from unwanted base stations cause interference, which decreases the SINR. This applies to a stronger base station being interfered by one or more weaker base stations and, even more so, to weaker base stations being interfered with by stronger ones. The interference between PRSs degrades the accuracy of the timing of the relevant impulse peaks in the CIR and thereby degrades positioning accuracy. The interference may also hide weak line-of-sight (LOS) components of the CIR, which may precede stronger impulses. In this case, the stronger impulses may be mistaken for the LOS component.

When the reuse factor is greater than one (n>1), the potential reduction of SINR by filtering (averaging) is more limited than if a higher proportion of REs had been used from each base station, i.e., using a lower reuse factor. All received interference is fully interfering when the time difference of arrival is within the OFDM symbol time, or even within the cyclic prefix used for the transmission. At low SINR, positioning accuracy is negatively impacted.

Another drawback with the current OTDOA techniques is that it requires a significant overhead for transmission of PRSs.

SUMMARY

The present disclosure relates generally OTDOA techniques for determining a position of a UE. One aspect of the disclosure comprises the simultaneous transmission of the same PRS or other positioning signal (e.g., reference signal)

from multiple base stations as a Single Frequency Network (SFN) signal. In this way, interference between received PRSs from different base stations is reduced, since they may add constructively at the UE. Each PRS signal may then appear as a distinct impulse in the estimated composite CIR for the SFN signal, which is based on the sum of all received PRS signals. The noise-like interference that is typically caused by other base stations using overlapping REs for their respective PRSs is therefore absent.

If at least three base stations can be associated with corresponding (LOS) impulses in the composite CIR, and the OTDOA between pairs of such impulses may be estimated, these OTDOA values may be used for position estimation using triangulation. When there is no overlap between a received CIR and such a LOS impulse, the LOS impulse may be detected with higher accuracy than would have been possible had noise-like interference also been present.

To minimize the impact of overlapping CIRs, different variations of the same basic PRS or other positioning signal are transmitted from each base station to effect an observed time shift at the UE between the different variations of the PRS. The different variations can be implemented as cyclic shifts in the time domain PRS signal, which is introduced before the cyclic prefix is added. These cyclic shifts are known by the UEs, e.g., from signaling via a location server.

For a given reception point, the estimated composite CIR will consist of different combinations of relative timing between LOS impulses associated with different variations of the PRS, which will increase the probability of identifying the LOS impulses without overlapping CIRs.

The solution can also be extended to a combination of PRSs and data broadcast in an SFN. The network needs to be an SFN only with respect to specific radio resources used for positioning, and not in other radio resources. In this case, dedicated PRSs may be used for coarse positioning, after which a finer positioning may be achieved by also exploring the de/re-modulated broadcast data, from which a CIR with higher SINR may be estimated and consequently a higher positioning accuracy obtained.

A first aspect of the disclosure comprises methods implemented by a receiving terminal of receiving a positioning reference signal transmitted by two or more base stations. In one embodiment, the method comprises receiving, in a first time period, two or more variations of the positioning signal, said two or more variations of the positioning signal being transmitted synchronously by respective ones of the two or more base stations as an SFN signal to effect one or more time shifts at the receiving terminal between different ones of the variations of the positioning signal. The method further comprises detecting time positions of impulses in a first composite channel impulse response of the SFN signal transmitted in the first time period, the impulses corresponding to the two or more variations of the positioning signal.

A second aspect of the disclosure comprises methods implemented by a base station of transmitting a positioning signal for use in determining a position of a receiving terminal. In one embodiment, the method comprises generating a first variation of the positioning signal to be transmitted as an SFN signal to effect one or more time shifts at the receiving terminal between the first variation of the positioning signal and one or more different variations of the positioning signal transmitted synchronously by one or more other base stations. The method further comprises transmitting, in a first time period as the SFN signal, the first variation of the positioning signal synchronously with the one or more different variations of the positioning signal transmitted by the one or more other base stations.

A third aspect of the disclosure comprises methods implemented by a positioning node in a wireless communication network for estimating a position of a receiving terminal. In one embodiment the method comprises receiving first raw time values determined by the receiving terminal, wherein the first raw time values are based on to two or more variations of a positioning signal transmitted synchronously by respective ones of two or more base stations in the wireless communication network to the receiving terminal as a single frequency network (SFN) signal during a first time period to effect one or more time shifts at the receiving terminal between the different ones of the two or more variations of the positioning signal. The method further comprises adjusting the first raw time values to account for the one or more time shifts between the different ones of the two or more variations of the positioning signal and calculating a first position estimate of the receiving terminal based on the adjusted first raw time values.

A fourth aspect of the disclosure comprises a receiving terminal (e.g., UE) configured to perform the method according to the first aspect. In one embodiment, the receiving terminal comprises an interface circuit configured for communication with the wireless communication network, and a processing circuit. The processing circuit is configured to receive, in a first time period, two or more variations of the positioning signal, said two or more variations of the positioning signal being transmitted synchronously by respective ones of two or more base stations as an SFN signal to effect one or more time shifts at the receiving terminal between different ones of the variations of the positioning signal. The processing circuit is further configured to detect time positions of impulses in a first composite channel impulse response of the SFN signal transmitted in the first time period, the impulses corresponding to the two or more variations of the positioning signal.

A fifth aspect of the disclosure comprises a base station configured to perform the method according to the second aspect. In one embodiment, the base station comprises an interface circuit configured for communication with a receiving terminal in the wireless communication network, and a processing circuit. The processing circuit is configured to generate a first variation of a positioning signal to be transmitted as an SFN signal to effect one or more time shifts at the receiving terminal between the first variation of the positioning signal and one or more different variations of the positioning signal transmitted synchronously by one or more other base stations. The processing circuit is further configured to transmit, in a first time period as the SFN signal, the first variation of the positioning signal synchronously with the one or more different variations of the positioning signal transmitted by the one or more other base stations.

A sixth aspect of the disclosure comprises a positioning node in a wireless communication network configured to perform the method according to the third aspect. In one embodiment, the positioning node comprises an interface circuit configured for communication with other network nodes in the wireless communication network, and a processing circuit. The processing circuit is configured to receive first raw time values determined by the receiving terminal, wherein the first raw time values are based on two or more variations of a positioning signal transmitted synchronously by respective ones of two or more base stations in the wireless communication network to the receiving terminal as a single frequency network (SFN) signal during a first time period to effect one or more time shifts at the receiving terminal between the different ones of the two or more variations of the positioning signal. The processing circuit is further configured adjust the first raw time values to account for the one or more time shifts between the different ones of the two or more variations of the positioning signal and to calculate a first position estimate of the receiving terminal based on the adjusted time first raw values.

A seventh aspect of the disclosure comprises a computer program product comprising executable instructions, that when executed by a processing circuit in a receiving terminal, causes the receiving terminal to perform the method according to the first aspect.

An eighth aspect of the disclosure comprises a computer program product comprising executable instructions, that when executed by a processing circuit in a base station, causes the base station to perform the method according to the second aspect.

A ninth aspect of the disclosure comprises a computer program product comprising executable instructions, that when executed by a processing circuit in a positioning node, causes the positioning node to perform the method according to the third aspect.

DETAILED DESCRIPTION

The present disclosure relates generally OTDOA techniques for determining a position of a UE. Exemplary embodiments of the OTDOA positioning techniques are described herein in the context of a LTE/NR network. Those skilled in the art will appreciate however, that the OTDOA techniques described herein can be applied in networks operating according to other standards where Orthogonal Frequency Division Multiplexing (OFDM) is used.

Figure 1:
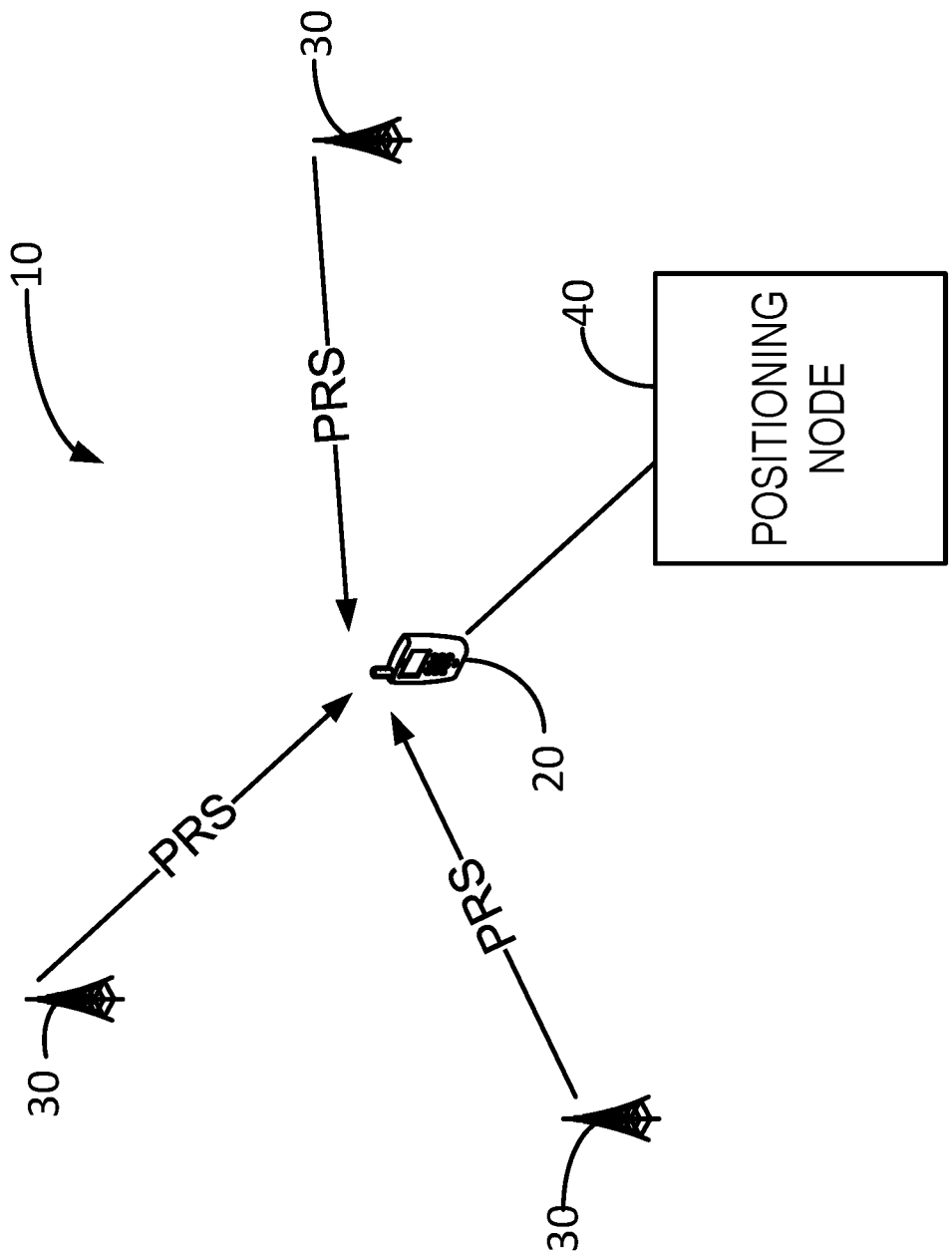
FIG. 1 illustrates an exemplary communication network in which OTDOA positioning techniques as herein described are employed.

FIG. 1 illustrates an exemplary wireless communication network 10 including a plurality of base stations 30 communicating with UEs 20 in respective cells or service areas served by the base stations 30. In LTE networks, the base stations 30 are also referred to as Evolved NodeBs (eNBs). In NR networks, the base stations 30 are also referred to as 5G NodeBs (gNBs). The UEs 20 may comprise any type of equipment capable of communicating with the base stations 30 over a wireless communication channel. For example, the UEs 20 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10. In the example shown in FIG. 1, only three base stations 30 and one UE 20 are shown, but the communication network 10 could comprise any number of base stations 30 and UEs 20. The UE 20 is an example of a receiving terminal for receiving positioning signals. The present disclosure also applies to other receiving terminals, such as a base station receiving positioning signals. The term receiving terminal will when appropriate be exemplified by reference numeral 20 referring to the illustration in the Figures.

Figure 2A:
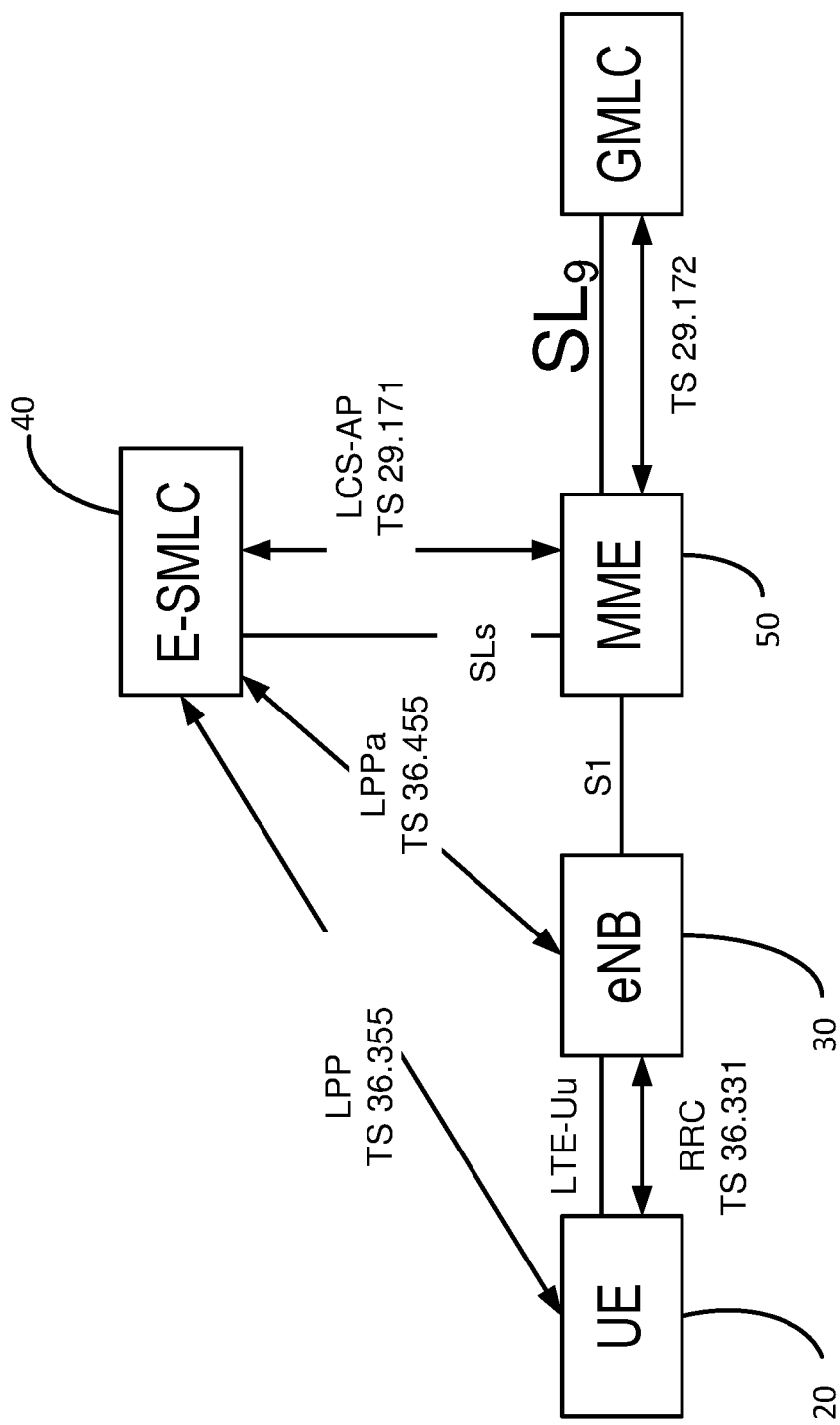
FIGS. 2A and 2B illustrate reference architectures for positioning used in LTE and NR networks respectively.

Positioning in LTE is supported by the architecture shown in FIG. 2A, with direct interactions between a UE 20 and a location server 40, which is referred to in LTE as the Evolved Serving Mobile Location Center (E-SMLC). The UE 20 communicates with the location server 40 using the LTE Positioning Protocol (LPP). Further, there are also interactions between the location server 40 and the base station 30 using the LPP A (LPPa) protocol, which are supported to some extent by interactions between the base station 30 and the UE 20 using the Radio Resource Control (RRC) protocol. The location server 40 communicates with a Mobility Management Entity (MME) 50 over the LCS-AP interface.

Figure 2B:
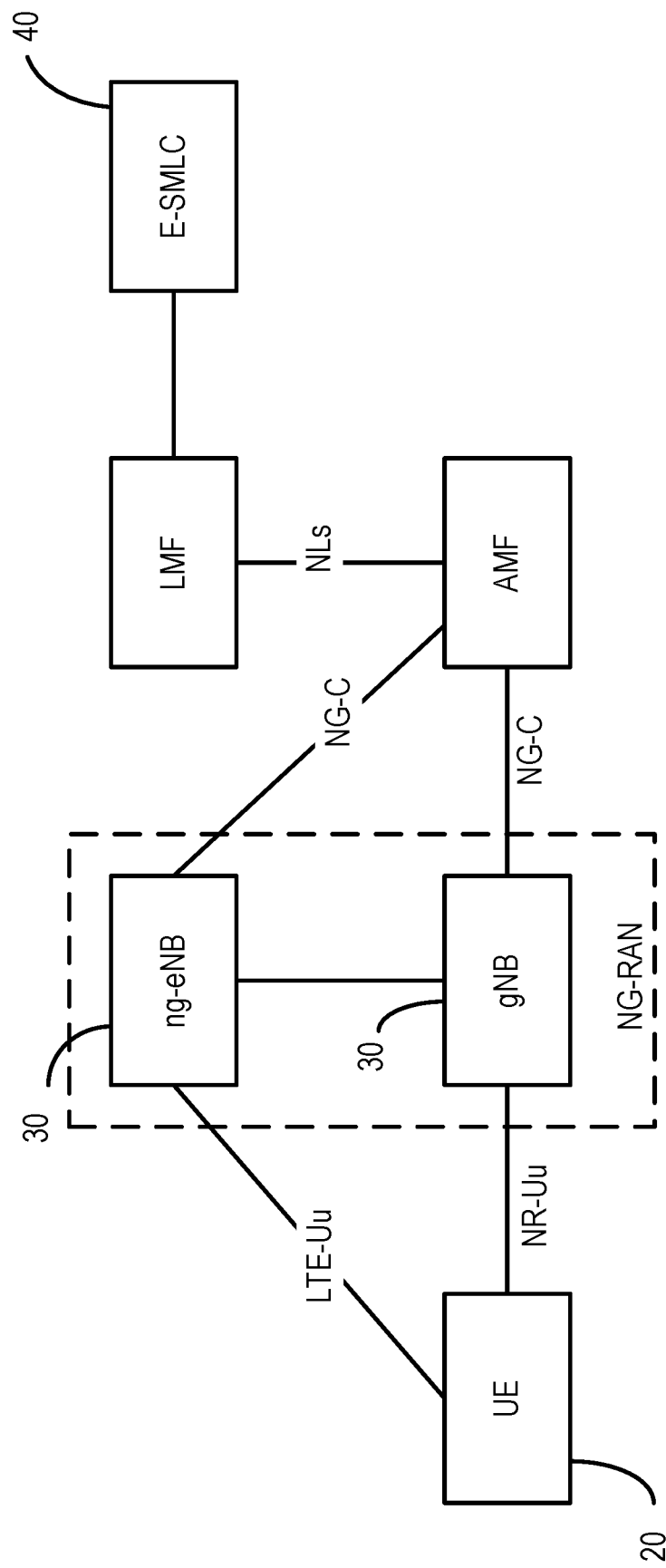

Positioning in NR networks is supported by the architecture shown in FIG. 2B.

The location server 40 is an example of a positioning node for estimating a position of a receiving terminal. The terms positioning node and location server are used interchangeably herein and will when appropriate be exemplified by reference numeral 40 referring to the illustration in the Figures.

Figure 3A:
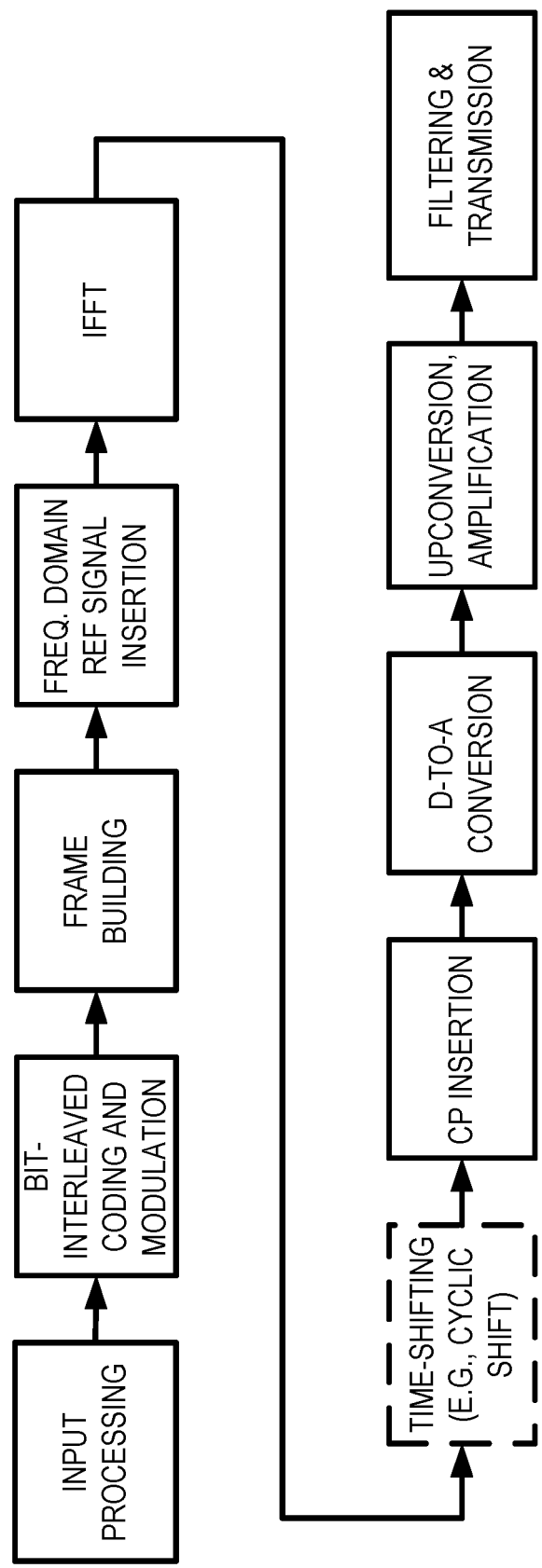
FIGS. 3A and 3B illustrates exemplary signal processing employed at the base station for transmission of an OFDM signal containing a positioning signal.
Figure 3B:
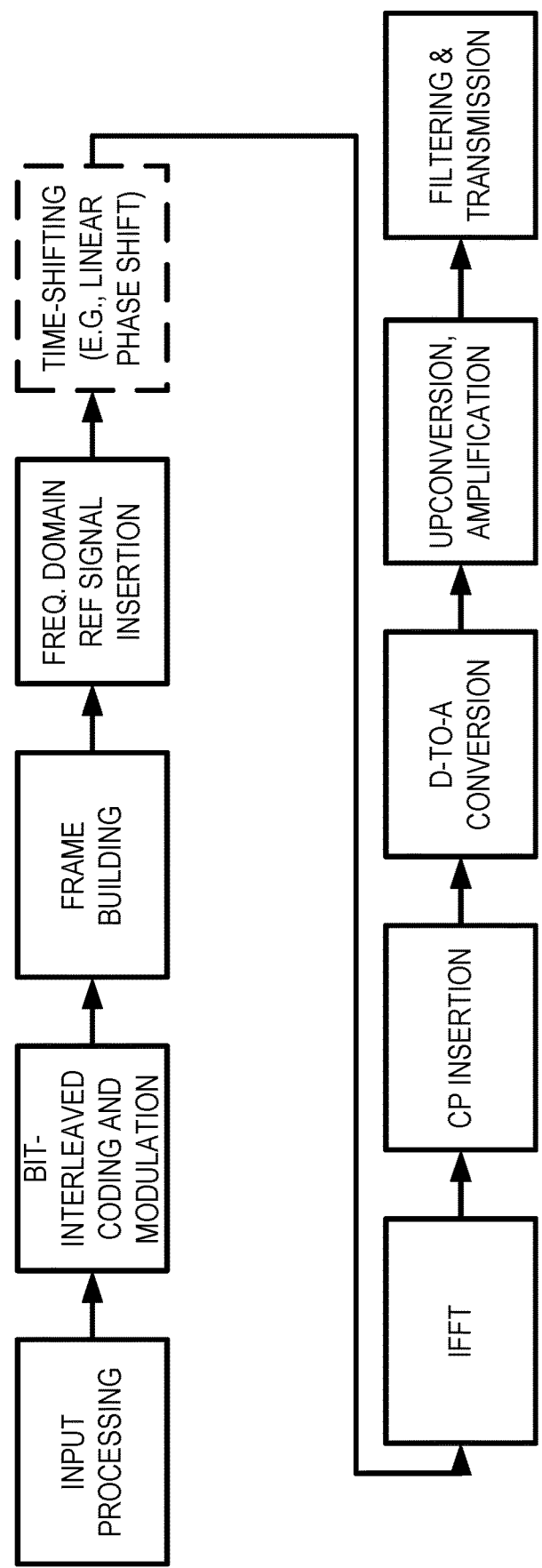

LTE networks use OFDM on the downlink where the input data passes several processing stages before final transmission as depicted in FIGS. 3A and 3B. The main processing steps are illustrated by solid lines in FIGS. 3A and 3B. After input processing, the input signal is interleaved, coded and modulated to obtain a frequency-domain signal comprising complex-valued numbers. The frequency domain signal is formatted into frames, after which frequency-domain reference signals are inserted. The frequency-domain reference signals may comprise PRSs or other reference signals used for positioning. The frequency-domain signal is then transformed by an Inverse Fast Fourier Transform (IFFT) into a complex-valued time domain signal. In conventional LTE systems, a cyclic prefix (CP) is added to the time domain signal following IFFT processing. The resulting signal is then converted from digital to analog form and up-converted to radio frequency (RF). The RF signal is then amplified, filtered, and transmitted via one or more RF antennas. Before the IFFT, the complex values may directly be referred to as REs.

According to one aspect of the disclosure, a common positioning signal transmitted by the base stations 30 is modified by each base station 30 in a particular way prior to transmission to effect a deliberate delay or time shift at the UE 20. In embodiments of the present disclosure, different base stations 30 transmit different variations of the same basic PRS or other positioning signal synchronously as an SFN signal to effect an observed time shift at the UE 20 between the different variations of the basic PRS signal or positioning signal. The different variations are also referred to herein as variants. As described in more detail below, this added time shift resulting from the transmission of different variants by different base stations 30 effectively spreads the corresponding channel impulses in the CIR of the SFN signal in the time domain so that the UE 20 is better able to detect and discriminate between different instances of the positioning signal transmitted from different base stations 30. In the processing flow shown in FIG. 3A, the time shift is effected by an extra signal modification step (e.g., cyclic shift), which is shown in dashed lines, following the IFFT. In the processing flow shown in FIG. 3B, the extra signal modification step (e.g., linear phase shift) is performed prior to the IFFT processing and follows the insertion of the reference signal into the frequency domain signal.

In one embodiment, multiple base stations 30 transmit the same basic positioning signal, which may comprise a dedicated PRS, which is introduced in the frequency domain using a dedicated set of REs from each base station 30. RE positions not used by the PRS from a particular base station 30 may be used for other purposes or not at all. In the latter case, they may be transmitted with zero energy. The REs allocated for the transmission of the PRS may be transmitted with increased energy ("boosting") so that the total power of an OFDM symbol remains at a desirable level, e.g., constant.

Conventionally, the network allocates basic PRSs to the base stations 30 according to a reuse-n scheme, so that every nth base station 30 uses the same basic set of REs for the PRS. As a special case where n=1, all base stations in the network 10 use the same basic PRS in an SFN mode of operation. As another special case, n=6, which is the same reuse factor for the PRS as specified in LTE. Any other value of n, with associated reuse pattern, may alternatively be used.

Figure 4A:
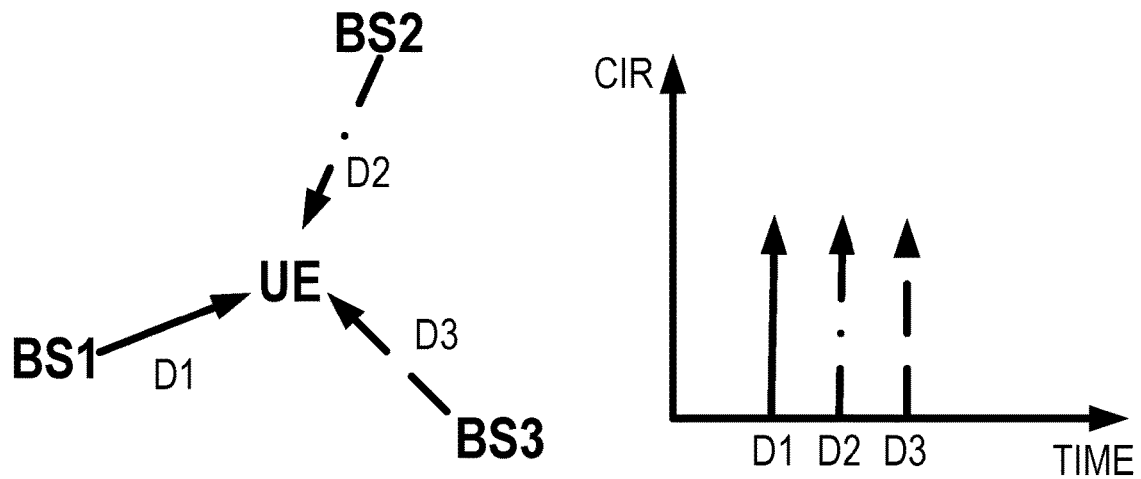
FIG. 4A illustrates PRSs transmitted as an SFN signal without time shifting.
Figure 4B:
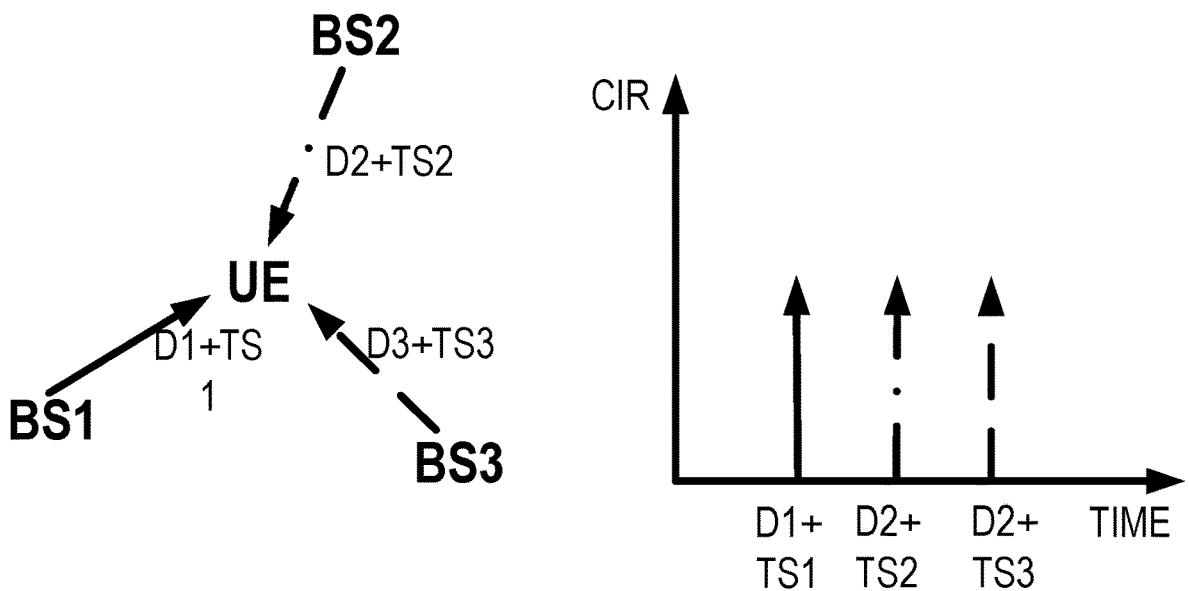
FIG. 4B illustrates PRSs transmitted as an SFN signal with time shifting.

According to one aspect of the disclosure, the basic PRS transmitted by each base station 30 is subject to a deliberate delay (DD) or time shift, introduced e.g. as a cyclic shift (before the CP is appended) in the time domain as shown in FIG. 3A, or as linear phase shift in the frequency domain just before the IFFT as shown in FIG. 3B. This shift causes the impulses associated with different variations of the same basic PRS in the CIR of the SFN signal to be cyclically shifted as shown in FIGS. 4A and 4B. FIG. 4A illustrates the transmission of a PRS or other positioning signal without an added time shift. In FIG. 4A, the PRS from each base station 30 arrives with a corresponding delay D1, D2 and D3 In FIG. 4B, the PRS from each base station 30 arrives with a corresponding delay D1+TS1, D2+TS2 and Ds+TS3. The added time shifts TS1, TS2 and TS3 effectively spreads the impulses in the CIR associated with different variations of the same basic PRS in the time domain.

Although it is contemplated that dedicated PRS will be used for positioning in some embodiments, the same techniques can be applied to other reference signals used for other purposes, such a synchronization signals, channel state information (CSI) reference signals and phase tracking signals. When used for position estimation, these other reference signals are also considered to be positioning signals. Therefore, the term positioning signal is used herein in a broad sense to include any signal used for position estimation, such as PRSs or other dedicated positioning signals, synchronization signals, CSI reference signals, etc.

In some embodiments, downlink data signals may also be used as positioning signals. Generally, a downlink data signal (e.g., broadcast data signal) can be demodulated by the UE 20 to obtain a received data signal. The received data signal can then be re-modulated to obtain an estimate of the transmitted signal, which can be used as a reference signal for position estimation. In this case, the remodulated signal can be correlated with the received downlink signal to generate an estimate of the CIR associated with the received downlink signal.

Thus, a data signal transmitted by multiple base stations as an SFN signal can be used in embodiments as a positioning signal. In some embodiments, SFN data signals are used as positioning signal without the addition of a DD or time shift. In other embodiments, a DD or time shift may be added to generate different variations of the SFN data signal. In this context, the re-modulated data signals are also considered to be positioning signals when used for position estimation.

Following is one example of how a DD or time shift is introduced in a basic OFDM symbol consisting of the three equally long and consecutive time-domain parts A, B and C. It is assumed in this example that the basic OFDM symbol is transmitted by three base stations 30, denoted as BS1, BS2 and BS3. The basic idea is that each base station BS1, BS2, and BS3 generates a different variation of the basic OFDM signal (e.g., ABC) by applying a cyclic shift as follows:

BS1: ABC (no cyclic shift)
BS2: BCA (cyclic shift of ⅓rd of the symbol time)
BS3: CAB (cyclic shift of ⅔rd of the symbol time)

If also a cyclic prefix of length ⅓rd of the symbol period is added, the resulting OFDM symbols for the three base stations 30 become:

BS1: CABC (no cyclic shift)
BS2: ABCA (cyclic shift of ⅓rd of the symbol time)
BS3: BCAB (cyclic shift of ⅔rd of the symbol time)

For simplicity, the length of the cyclic prefix in the example is chosen to be the same as the lengths of A, B and C, but may in the general case be independently chosen. Similarly, the applied cyclic shifts of all base stations (here BS1, BS2 and BS3) may be independently chosen in the general case to allow optimized performance.

While the example shown above relies on signal modification in the time domain as shown in FIG. 3A, the same result can be achieved by applying a linear phase shift to each OFDM symbol in the frequency domain as shown in FIG. 3B.

In practice, each base station 30 is assigned to transmit a particular variation of the basic positioning signal for a given OFDM symbol period. The assignment of the particular variations of the basic positioning signal to particular base stations 30 may be based on some global optimization criterion for the communication network 10, taking into account geographical distances between base stations 30 and other relevant factors. Each base station 30 transmits its assigned variation synchronously as an SFN signal with the other variations of the positioning signal transmitted by other base stations 30. When the UE 20 correlates the composite SFN signal with the basic positioning signal to generate a composite CIR for the SFN signal, the time positions of impulses associated with the different variations of the positioning signal will be shifted in time relative to one another. This time shift will allow the UE 20 to better discriminate between the positioning signals transmitted from different base stations 30. The UE 20 or other location server 40 needs to take this time shift into account when performing position estimation based on the OTDOA values. This information may be known a priori from the relevant standard, or may be signaled explicitly to the UE 20, or a combination thereof. In one embodiment, a code or index value is signaled to the UE 20 indicating which particular time shift values are used among a limited range of pre-determined time shift values.

In some embodiments, the variants of the positioning signal transmitted by each base station 30 may also be time varying. That is, the association between signal variations and base stations 30 may itself vary in different OFDM symbol periods. In this case, a UE 20 will, at different points in time, e.g. during different OFDM symbol periods, experience different time shift patterns between the PRS transmitted from the same base stations 30. As an example, a first base station 30 may transmit PRS1 and PRS2 in two respective OFDM symbol periods. A second base station may transmit PRS2 and PRS3 in the same two respective OFDM symbol periods. In this case, the time shift between the impulses in the composite CIR associated with the first base station 30 and the second base station 30 will vary in the two OFDM symbol periods. The time varying nature of the time shift between positioning signals can aid in identifying different impulses in the CIR of the SFN signal.

When n=1, the UE 20 receives the same basic PRS or other positioning signal from all base stations 30, although with different and potentially time-varying time shifts. For each received OFDM symbol, the conditions therefore are the same as in an SFN, which means that no real interference occurs if the time differences are within the range of the CP and the UE 20 is appropriately synchronized to the received positioning signals. For time differences exceeding the CP, but remaining within the symbol time $T_U$, the received PRSs from different base stations 30 partly contribute constructively to the estimated CIR and only partly destructively as noise-like interference.

The variations of the PRS transmitted as an SFN signal will appear to the UE 20 as discrete impulses in a "global" composite CIR for the SFN signal instead of in individual CIRs from each base station 30. The composite CIR for the SFN signal can be obtained by estimating the composite SFN channel in the frequency domain and performing an IFFT on the frequency domain estimate to obtain the CIR of the composite SFN channel. In one embodiment, the frequency domain channel estimate, or channel transfer function, is estimated by dividing, in the frequency domain, each received PRS RE value with the known transmitted value. In cases where the PRS uses less than all of the REs in a symbol period, the missing RE values can be interpolated in time and frequency using the values obtained for the PRS REs and low-pass filtered to obtain the channel transfer function. The UE 20 then performs an IFFT on the channel transfer function to arrive at the composite CIR. Alternatively, the missing REs can be discarded, in which case the IFFT is performed only on the REs allocated to the PRS or positioning signal.

Once the composite CIR is obtained, the UE 20 needs to 1) identify, as accurately as possible, the time positions of the impulses corresponding to the LOS components of the received reference signals, and 2) associate each such time position with a particular base station 30. For time and frequency interpolation, with n=1, the PRS potentially uses all REs in the relevant OFDM symbols, which allows for a high degree of interference reduction via time and/or frequency low-pass filtering, which increases the SINR.

When identifying the LOS components in the composite CIR, there may be reception points where the LOS impulses from positioning signals are so close that it becomes difficult to distinguish between them. In embodiments where the association between variations of the positioning signal and base stations also varies in different OFDM symbol periods, impulses from LOS components that appear close in one OFDM period may be more distant in other OFDM periods. In this case, the UE 20 can use a "clear" instance of an impulse in one time period to infer its position in another time period, taking into account the known time shift values, so that these close impulses may nevertheless be resolved. Alternatively, the UE 20 may only use the clear instances.

Because each base station 30 transmits the same basic PRS, the UE 20 needs to determine the association between impulses in the CIR and particular base stations 30. In some embodiments, hypotheses testing is used to infer the correct association between impulses and base stations 30. For example, in embodiments where the association is time varying, the UE 20 may form an association hypothesis for all relevant combinations of base station-to-impulse (hereinafter BS-to-impulse) association. For each association hypothesis, the UE 20 may take the known time shift value for different variations of the positioning signal into account and calculate the position using standard OTDOA triangulation techniques in two or more different time periods. If the hypothesis is correct, the resulting estimated position should remain consistent in different time periods. If the association hypothesis is not correct, the calculated position will vary from one time period to the next. The incorrect association hypotheses can be discarded since they will yield inconsistent/deviating estimated positions. The hypothesis testing may be simplified by performing it in steps, so that in a first step only the three strongest LOS impulses are targeted, which could allow for a first coarse estimation, which could then limit the range of possible associations when other base stations 30 and impulses are considered.

When the UE 20 is connected with a serving base station 30, some side information may be available to aid in the hypothesis testing. As one example, the cell ID of the serving base station 30 can be detected. The communication network 10 may also perform a ranging estimate by asking the UE 20 to take part in a corresponding measurement. In this way the communication network 10 and/or UE 20 may know both the approximate distance to the serving base station 30 and its identity. Translated to impulse detection and TDOA values, this knowledge means that the impulse corresponding to the serving base station 30 can be identified. Further, a priori information about the locations of the base stations 30 can be used to approximate TDOAs between different pairs of base stations 30. This information can be used to determine the most likely associations between base stations 30 and impulses in the composite CIR.

When n>1 (e.g., n=3 or n=6), the above-described method could be directly reused, with the difference that total set of base stations 30 would be divided into n independent groups, each of which uses a time shifted PRS as described above. As an example, with n=6, a base station 30 would (in principle) receive interference only from one of every six base stations 30 in the network 10, which could all be considered as a large SFN. The interference from unwanted PRSs using overlapping REs would not appear as noise-like distortion, but as additional impulses in the estimated composite CIR. Considering the resulting time shift observed at the UE 20, the risk of overlapping CIRs would, however, be reduced. One advantage with this approach is that the time position of the main impulse could be detected with higher accuracy, thanks to the absence or reduced level of noise-like distortion. Another advantage is that such interfering impulses may in some cases be positively used as impulses for positioning, since they originate from other base stations 30.

Figure 5:
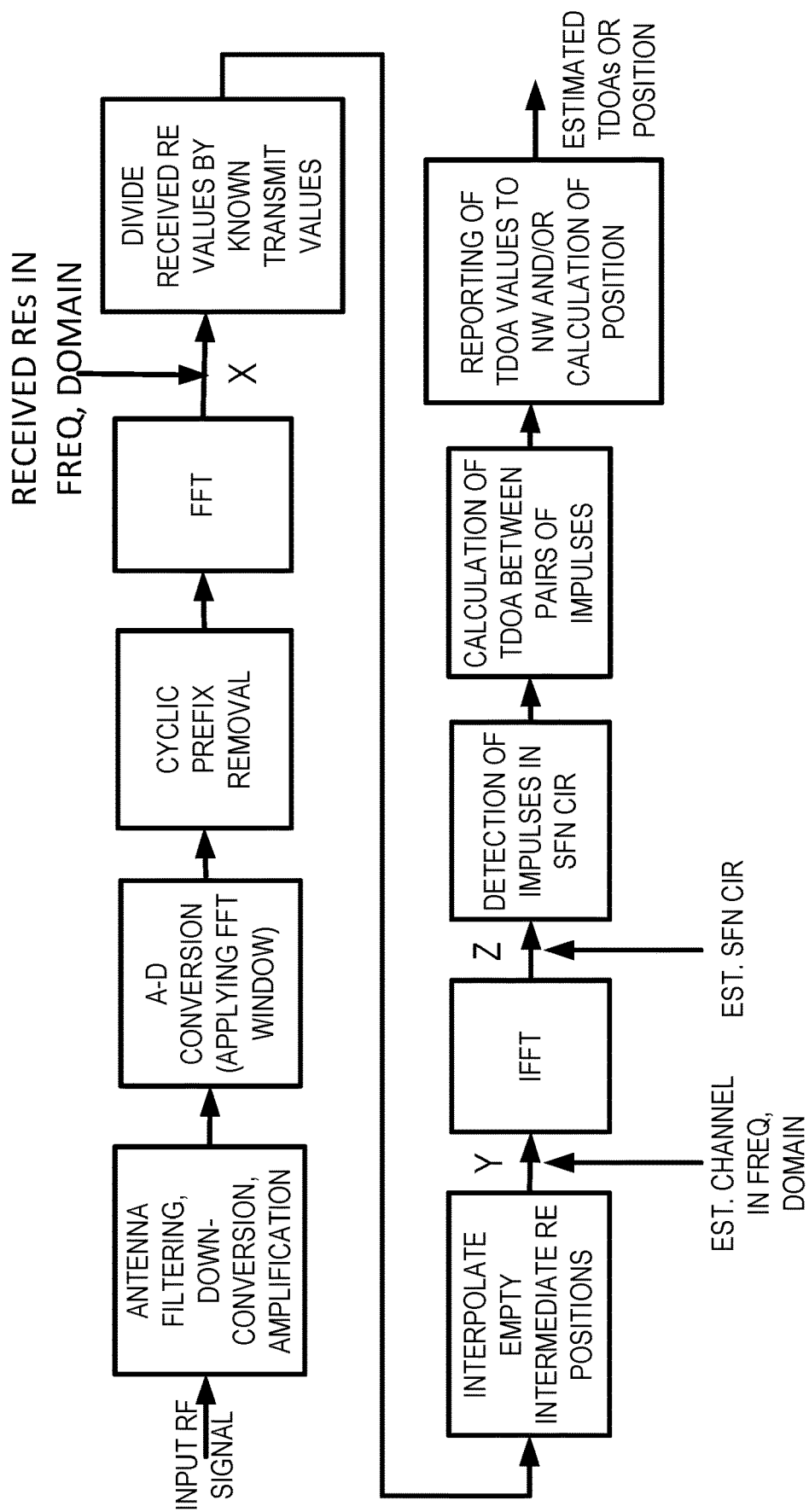
FIG. 5 illustrates exemplary signal processing employed at a UE or other receiving terminal for reception of an OFDM signal containing a positioning signal.

FIG. 5 illustrates exemplary processing by the UE 20 or other receiving terminal. The SFN signal received by the antenna is filtered, amplified and downconverted to baseband frequency. Following down-conversion to baseband frequency, the analog baseband signal is converted to a digital baseband signal. The cyclic prefix is removed from the SFN signal in the time domain and a Fast Fourier Transform (FFT) is performed to convert the SFN signal into the frequency domain. In the frequency domain, the channel transfer function is estimated by dividing the REs allocated to the PRS by the known values and interpolating intermediate RE values, if any. The frequency domain estimate of the SFN channel is then converted to the time domain by an IFFT to obtain the composite CIR of the SFN channel. The UE 20 detects LOS impulses in the composite CIR and calculates the TDOA between pairs of LOS impulses. The UE 20 can either calculate its position from the TDOA values or report the TDOA values to a location server 40 in the network that calculates the position.

In some embodiments of the disclosure, the estimated position of the UE 20 is determined in two steps. In the first step, a coarse position is estimated using a positioning signal transmitted as an SFN signal as described above. This step includes the BS-to-impulse association. In the second step, a fine position is determined using the coarse estimate and a broadcast signal or other data signal transmitted as an SFN signal. The SFN broadcast signal may be part of the same signal as the SFN signal. For convenience, the generic term data signal is used hereinafter to refer to both a broadcast signal and a data signal.

In the second step, the data signal transmitted as an SFN signal is demodulated to obtain a received data signal and then remodulated to generate an estimate of the transmitted data signal, which can be used as an a priori reference for positioning. By first dividing each received RE value with its re-modulated RE value, an estimate of the SFN channel may be obtained in the same manner as previously described. By taking the IFFT of the estimated channel, an estimate of the composite CIR is thereby obtained.

The positioning accuracy will benefit from the potentially much higher availability of REs for data, compared to dedicated PRS REs, which may allow for a higher degree of noise and interference reduction via low-pass filtering in time and frequency before the IFFT. In this way, the composite CIR for the data signal may have a higher SINR than a purely PRS-based scheme. The higher SINR in turn results in more accurate time estimates for the relevant LOS impulses resulting in a significantly improved accuracy in the final position estimates.

In one embodiment, broadcast data may be transmitted in an SFN without adding a time shift as is done for the PRSs. For the channel estimation of the received broadcast data, the transmitted data signals in the SFN could then use either a common reference signal or dedicated reference signals per base station 30, i.e., Cell-Specific Reference Signals (CRSs). In reception positions where a LOS impulse originating from one base station 30 is not interfered by the CIR of one or more other base stations 30, the time position of the relevant LOS impulse may then be estimated with higher accuracy. However, there may also be LOS impulses that overlap with CIRs from other base stations 30, which reduces the possibility to achieve higher accuracy at those positions.

Using different variations of the same basic broadcast signal to add a time shift to the impulses in the CIR for the broadcast signal, the risk of a LOS impulse with overlapping CIRs from other base stations 30 is significantly reduced, which may increase the probability that the time position of a certain LOS impulse can be estimated with high accuracy. The variations of the broadcast signal can be generated as previously described by applying a cyclic shift in the time domain or by applying a linear phase shift in the frequency domain. As noted above, the variations of the broadcast signal transmitted as an SFN signal will cause the data signal and the reference signals to be time shifted in the same way so that the received signals will appear to the UE 20 as if the whole signal is time shifted and its estimated CIR will be correspondingly time shifted.

When CRSs are used, these can be transmitted using orthogonal signals to avoid interference. The CRSs can also be transmitted with a certain reuse m, so that m different and orthogonal patterns of REs are used. Each CRS pattern needs to have a time/frequency density sufficient for estimation of the channel between each respective base station 30 and the UE 20 individually, and does not need to cover the whole SFN channel. For the channel correction, the UE 20 assembles the global composite CIR/channel estimate as the sum of the individually-estimated CIRs for the channels between respective base stations 30 and the UE 20, and uses this for the channel estimation/correction.

To assemble the global composite CIR from the individual CIRs, the UE 20 needs to know how much the individual CIRs need to be time shifted relative to each other. This can be achieved, for example, by exploiting an introduced regular reference signal in the downlink that covers the whole SFN channel. If these signals are also orthogonal, the UE 20 may then determine the relative delays between the individual CIRs from the various base stations 30. Alternatively, the dedicated SFN signal as described above may provide a coarse positioning estimation, based on which the relative delays may be calculated. It should be noted that only a coarse position needs to be known. That is, the coarse position estimate may itself be sufficiently accurate to resolve the aliasing ambiguity caused by the sub-sampling of the channel. The set of individual base station CIRs together with the resolved ambiguities will then yield the knowledge about the required time shift of the respective signals received from different base stations 30 for the UE 20 to assemble the composite CIR, which it then may use to demodulate the received data.

In some embodiments, the CRSs used for channel estimation of the data may also be used as orthogonal PRSs to generate the coarse position estimates, in which case no dedicated PRS would be needed. In this embodiment, the CRSs are effectively used as positioning signals.

In some embodiments, the estimated CIR may be up-sampled to a higher sampling frequency, so that the time between successive samples of the CIR (individual or composite) is shorter. To exploit the advantages of a higher SINR to get a better timing accuracy of LOS impulses, interpolation of the CIR samples may be performed, using standard techniques.

In some embodiments, a base station 30 or other network node may send an indication to the UE 20 to indicate that a positioning signal is being transmitted as an SFN signal. The indication may be provided for each of one or more positioning signals (e.g., per PRS). Responsive to the indication, the UE 20 may determine a number of TDOA values to report to the location server 40 based on the indication. For example, the UE 20 can be configured to report more TDOA values for more LOS paths in case the PRS is transmitted as an SFN compared to when separate PRSs are transmitted.

It is contemplated that the positioning techniques will be used to estimate the position of a UE 20 or other mobile terminal. However, the same techniques can be used to determine a position of a base station 30 or other receiving terminal. The base station 30 can be configured to receive PRS signals transmitted by other base stations 30 and estimate its position as herein described. The purpose of the position estimation may be for self-localization or time synchronization.

In one embodiment, the base stations 30 are operating in a time division duplex (TDD) configuration, meaning that the base stations 30 alternate between transmission and reception. In order to be able to receive the PRS from other base stations 30, the base stations 30 can be configured with a muting pattern to enable one base station 30 to be receiving while others are transmitting so that the PRSs from neighboring base stations 30 can be measured.

In another embodiment, the base stations 30 operate in a frequency domain duplex (FDD) configuration, and each base station 30 is configured with an extra receiver to enable reception of signals in the downlink band. In order to avoid dynamic range problems where the extra downlink receiver will be saturated to the base station downlink transmission, the base stations 30 can be configured with a muting pattern to avoid downlink interference from the same base station 30 while receiving downlink signals from the other base stations 30.

Figure 6A:
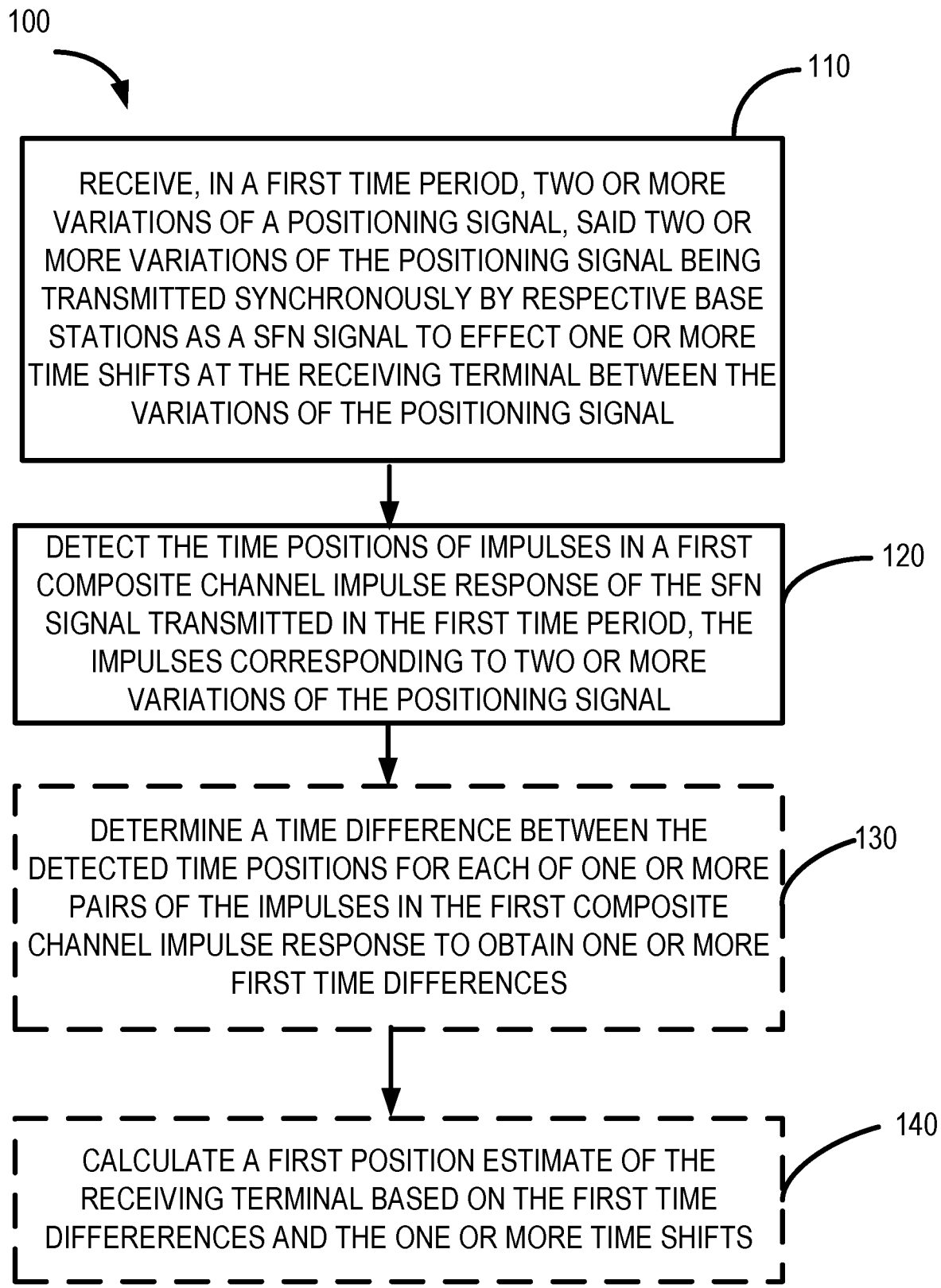
FIGS. 6A and 6B illustrate methods implemented by a UE or other receiving terminal of receiving a positioning signal transmitted as an SFN signal.
Figure 6B:
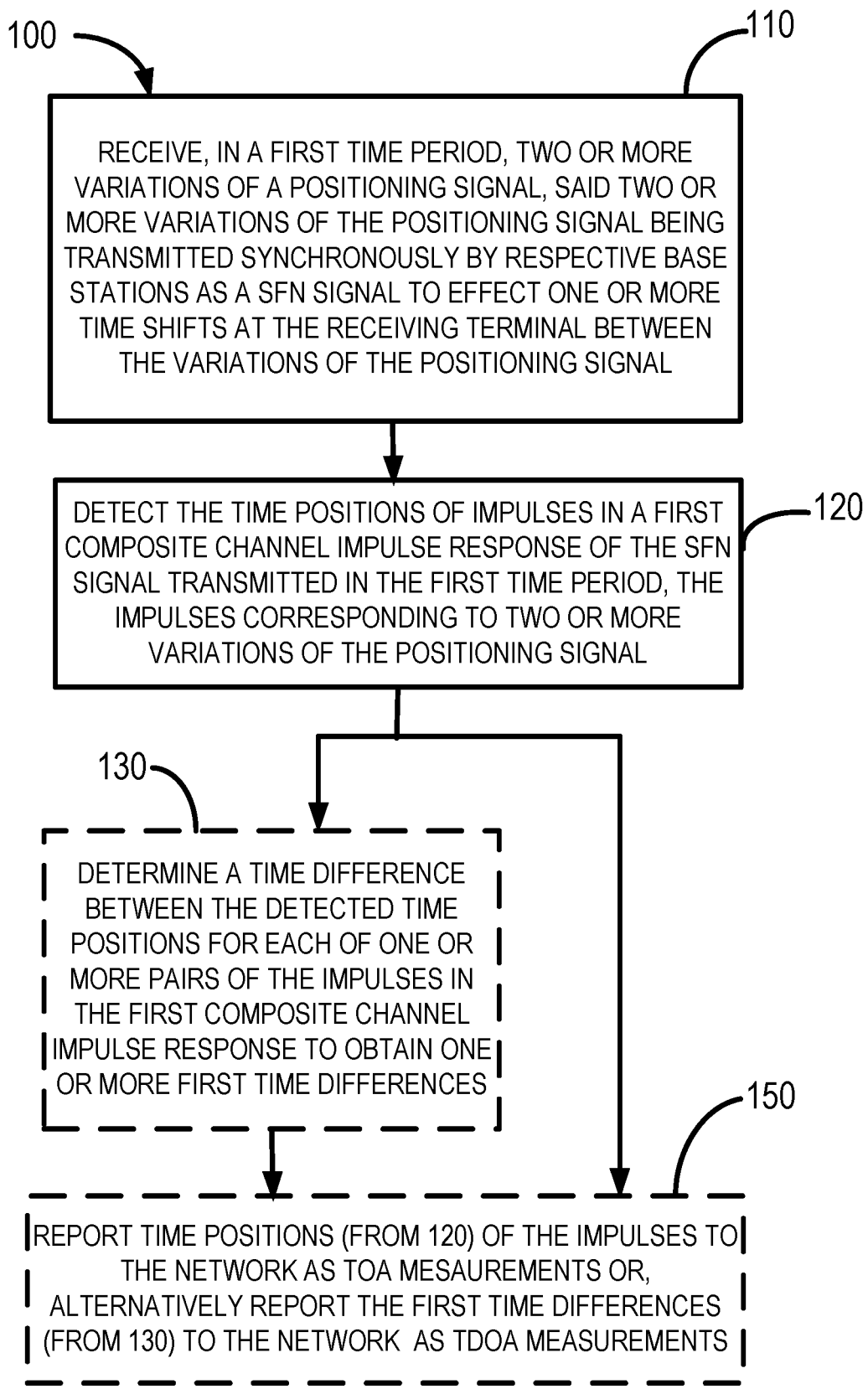

FIGS. 6A and 6B illustrate an exemplary method 100 implemented by a receiving terminal in a wireless communication network 10. The receiving terminal may be a UE 20 or a base station 30. The receiving terminal receives, in a first time period, two or more variations of a positioning signal, e.g., a common positioning signal shared by two or more base stations 30 (block 110). The two or more variations of the positioning signal are transmitted synchronously by respective ones of the two or more base stations 30 as a single frequency network (SFN) signal to effect one or more time shifts at the receiving terminal, e.g., UE 20, between different ones of the variations of the positioning signal. The receiving terminal further detects the time positions of impulses in a first composite channel impulse response (CIR) of the SFN signal transmitted in the first time period (block 120). The impulses in the first composite CIR correspond to the two or more variations of the positioning signal.

In some embodiments of the method 100, as shown in FIG. 6A, the receiving terminal further determines (e.g., measures) a time difference between the detected time positions for each of one or more pairs of the impulses in the first composite CIR to obtain one or more first time differences (block 130). The receiving terminal may further calculate a first position estimate for the receiving terminal, e.g., UE 20, based on the one or more first time differences and the one or more time shifts (block 140).

In some embodiments of the method 100, as shown in FIG. 6B, the receiving terminal optionally determines (e.g., measures) a time difference between the detected time positions for each of one or more pairs of the impulses in the first composite CIR to obtain one or more first time differences (block 130). The receiving terminal further reports time measurements to the network (block 150). The reported time measurements may be detected time positions reported as time of arrival measurements or determined time differences reported as time difference of arrival measurements.

As stated above (block 130), the method 100 may further comprise determining a time difference between the time positions for each of one or more pairs of the impulses in the first composite channel impulse response to obtain one or more first time differences.

Some embodiments of the method 100 further comprise (block 140) calculating a first position estimate for the receiving terminal based on the one or more first time differences and the one or more time shifts. The one or more time shifts may be one or more time shifts between the different ones of the variations of the positioning signal received in the first time period.

In some embodiments of the method 100, the first composite channel impulse response of the SFN signal transmitted in the first time period is determined by correlating the SFN signal received in the first time period with the positioning signal to obtain the first composite channel impulse response. Correlating the received SFN signal with the positioning signal to obtain the first composite channel impulse response may comprise generating a first frequency domain estimate of an SFN channel in the first time period by dividing, for each resource element allocated to the positioning signal, a value of the resource element by a corresponding value of the positioning signal, and transforming the first frequency domain estimate of the SFN channel to the time domain to obtain the first composite channel impulse response.

In some embodiments of the method 100, the positioning signal occupies less than all available resource elements transmitted in the first time period. In this case, the receiving terminal, e.g., UE 20, may determine, by interpolation, values of one or more resource elements in the first time period not allocated to the positioning signal before transforming the first frequency domain estimate of the SFN channel to the time domain. The receiving terminal, e.g., UE 20, may additionally low-pass filter the interpolated values for the resource elements not allocated to the positioning signal.

Some embodiments of the method 100 further comprise receiving, in a second time period, two or more variations of the positioning signal that have been transmitted synchronously by respective ones of the two or more base stations as an SFN signal to effect one or more time shifts at the receiving terminal between different ones of the two or more variations of the positioning signal. The receiving terminal, e.g., UE 20, in this embodiment, may further detect time positions of impulses in a second composite channel impulse response of the SFN signal transmitted in the second time period, the impulses corresponding to the two or more variations of the positioning signal. In some embodiments, the receiving terminal, e.g., UE 20, may further determine a time difference between the time positions for each of one or more pairs of the impulses in the second composite channel impulse response to obtain one or more second time difference. The receiving terminal, e.g., UE 20, may also calculate a second position estimate for the receiving terminal based on the one or more second time differences and the one or more time shifts. The one or more time shifts may be one or more time shifts between the different ones of the variations of the positioning signal received in the second time period.

In some embodiments of the method 100, the second composite channel impulse response of the SFN signal transmitted in the second time period is determined by correlating the SFN signal received in the second time period with the positioning signal to obtain the second composite channel impulse response. Correlating the received SFN signal with the positioning signal, which is a known positioning signal, to obtain the second composite channel impulse response may comprise generating a second frequency domain estimate of an SFN channel in the second time period by dividing, for each resource element allocated to the positioning signal, a value of the resource element by a corresponding value of the positioning signal, and transforming the second frequency domain estimate of the SFN channel to the time domain to obtain the second composite channel impulse response.

In some embodiments of the method 100, the positioning signal occupies less than all available resource elements transmitted in the second time period. The receiving terminal, e.g., the UE 20, may further determine, by interpolation, values of one or more resource elements in the second time period not allocated to the positioning signal before transforming the second frequency domain estimate of the SFN channel to the time domain. The receiving terminal, e.g., the UE 20, may also low pass filter the interpolated values for the resource elements not allocated to the positioning signal.

In some embodiments of the method 100, the receiving terminal, e.g., UE applies a first association between the two or more variations of the positioning signal and respective ones of the two or more base stations 30 in the first time period, and applies a second association between the two or more variations of the positioning signal and respective ones of the two or more base stations 30 in the second time period.

In some embodiments of the method 100, a unique reference signal transmitted by at least one of the two or more base stations 30 is used to determine the first association, the second association, or both.

In some embodiments of the method 100, a ranging measurement between the receiving terminal and at least one of the two or more base stations 30 is used to determine the first association, the second association, or both.

Some embodiments of the method 100 further comprise generating one or more association hypotheses regarding the respective first and second associations between the two or more variations of the positioning signals transmitted in the first and second time period respectively and corresponding ones of the two or more base stations 30, and testing one or more of the association hypotheses to identify the first and second associations.

In some embodiments of the method 100, the receiving terminal, e.g., UE 20, uses side information to reduce a number of possible hypotheses to be tested.

In some embodiments of the method 100, testing one or more of the association hypotheses comprises, for each association hypothesis tested calculating the first position estimate based on the one or more first time differences and the association hypothesis, calculating the second position estimate based on the one or more second time differences and the association hypothesis, and verifying the association hypothesis based on a comparison of the first and second position estimates.

In some embodiments of the method 100, the receiving terminal, e.g., UE 20, further determines a final position estimate based on the first position estimate, the second position estimate, or both responsive to verifying the association hypothesis.

In some embodiments of the method 100, the receiving terminal, e.g., UE 20, further determines a coarse position estimate based on the first position estimate, the second position estimate, or both, and refines the coarse position estimate based on an SFN broadcast signal to obtain a fine position estimate. Refining the coarse position estimate may comprise demodulating the SFN broadcast signal to obtain a received broadcast signal, remodulating the received broadcast signal to obtain an estimate of the transmitted broadcast signal for use as a reference signal, generating a c composite channel impulse response, of the SFN broadcast signal based on the estimate of the transmitted broadcast signal, and detecting time positions of one or more impulses in the composite impulse response, e.g., composite channel impulse response, of the SFN broadcast signal.

In some embodiments of the method 100, the receiving terminal, e.g., UE 20, further measures a time difference between the time positions for each of one or more pairs of the impulses in the composite impulse response, e.g., composite channel impulse response, of the SFN broadcast signal to obtain a set of third time differences. In other embodiments of the method 100, the receiving terminal, e.g., UE 20, further determines the fine position estimate of the receiving terminal 20 based on the set of third time differences.

Some embodiments of the method 100 further comprise receiving two or more variations of the broadcast signal, said two or more variations of the broadcast signal being transmitted synchronously by respective ones of the two or more base stations 30 as an SFN broadcast signal to effect one or more time shifts at the receiving terminal 20 between different ones of the two or more variations of the broadcast signal. Determining the fine position estimate of the receiving terminal, e.g., UE 20, may be further based on the one or more time shifts between different ones of the two or more variations of the broadcast signal.

Some embodiments of the method 100 further comprise reporting (box 150) the time positions of the impulses in the first composite channel impulse response, the second composite channel impulse response, or both as time of arrival measurements. Other embodiments of the method 100 further comprise reporting the first time differences, the second time differences, or both as time difference of arrival measurements.

Some embodiments of the method 100 further comprise receiving, from at least one of the two or more base stations, an indication that the positioning signal is being transmitted as an SFN signal. Some embodiments of the method 100 further comprise determining a number of time difference of arrival measurements to report depending on the indication.

Figure 7:
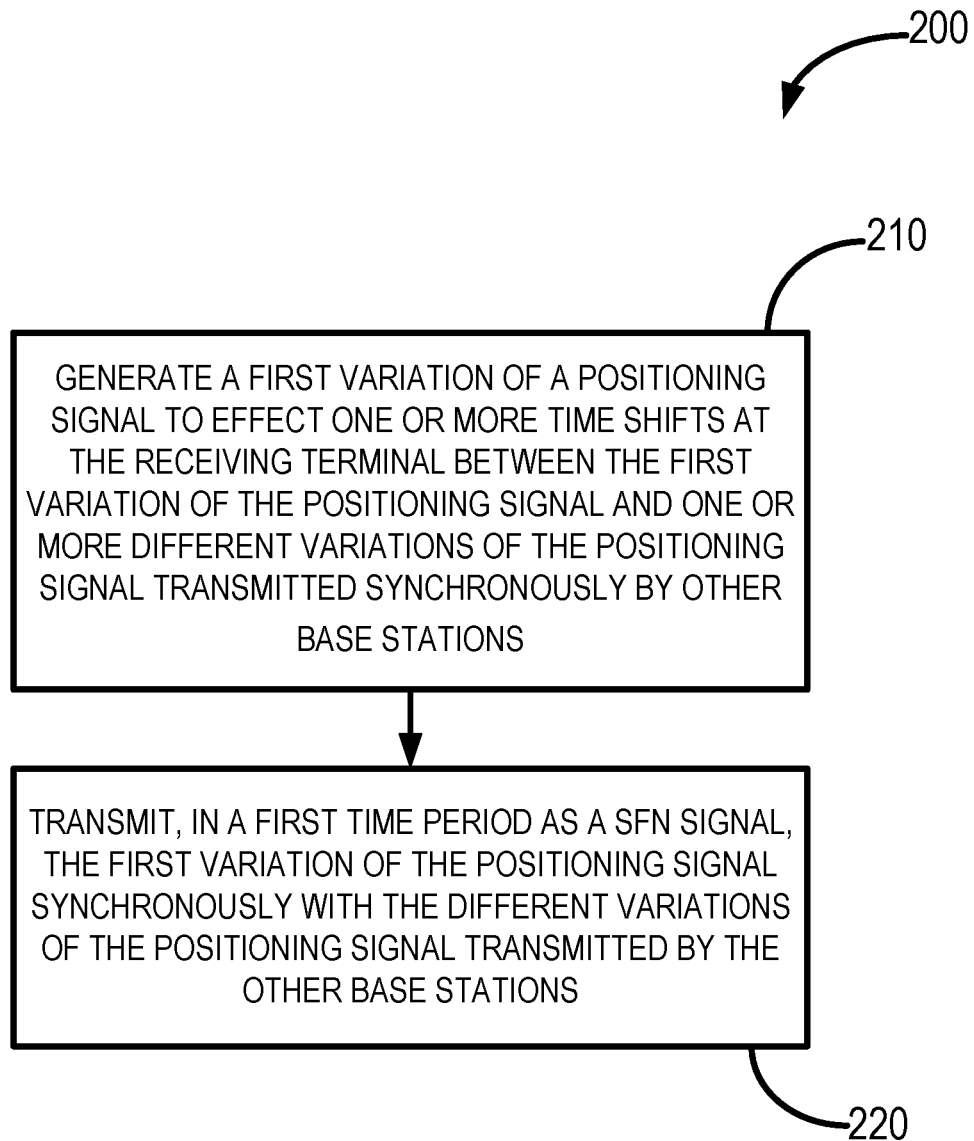
FIG. 7 illustrates a method implemented by a base station or other transmission point of transmitting a positioning signal as an SFN signal.

FIG. 7 illustrates a method 200 implemented by a base station 30 in a wireless communication network 10 of transmitting positioning signals for use in determining a position of a UE 20 or other receiving terminal. In one embodiment, the base station 30 generates a first variation of a positioning signal, e.g., a common positioning signal shared by two or more base stations 30, to be transmitted as an SFN signal to effect one or more time shifts at the receiving terminal, e.g., UE 20, between the first variation of the positioning signal and one or more different variations of the positioning signal transmitted synchronously by one or more other base stations (block 210). The base station 30 further transmits, in a first time period, the first variation of the positioning signal synchronously with the one or more different variations of the positioning signal transmitted by the one or more other base stations (block 220).

In some embodiments of the method 200, said generating the first variation of the positioning signal comprises applying, in a time domain, a first cyclic shift to the positioning signal. In other embodiments of the method 200, said generating the first variation of the positioning signal comprises applying, in a frequency domain, a first linear phase shift to the positioning signal.

In some embodiments of the method 200, said transmitting the first variation of the positioning signal further comprises transmitting the first variation of the positioning signal on less than all available resource elements in the first time period.

Some embodiments of the method 200 further comprise boosting the transmit power of the resource elements in the first time period allocated to the positioning signal.

Some embodiments of the method 200 further comprise generating a second variation of the positioning signal to be transmitted as an SFN signal to effect one or more time shifts at the receiving terminal between the second variation of the positioning signal and one or more different variations, including the first variation, of the positioning signal transmitted synchronously by the one or more other base stations, and transmitting, in a second time period as an SFN signal, the second variation of the positioning signal synchronously with the one or more different variations of the positioning signal transmitted by the other base stations.

In some embodiments of the method 200, generating the second variation of the positioning signal comprises applying, in a time domain, a second cyclic shift to the positioning signal.

In some embodiments of the method 200, generating the second variation of the positioning signal comprises applying, in a frequency domain, a second linear phase shift to the positioning signal.

Some embodiments of the method 200 said transmitting the second variation of the positioning signal further comprises transmitting the second variation of the positioning signal on less than all available resource elements in the second time period.

Some embodiments of the method 200 further comprise boosting the transmit power of the resource elements in the second time period allocated to the positioning signal.

In some embodiments of the method 200, the base station 30 mutes the transmission of the positioning signal in one or more time periods.

Some embodiments of the method 200 further comprise sending, to the receiving terminal, an indication that the positioning signal is being transmitted as an SFN signal.

Figure 8:
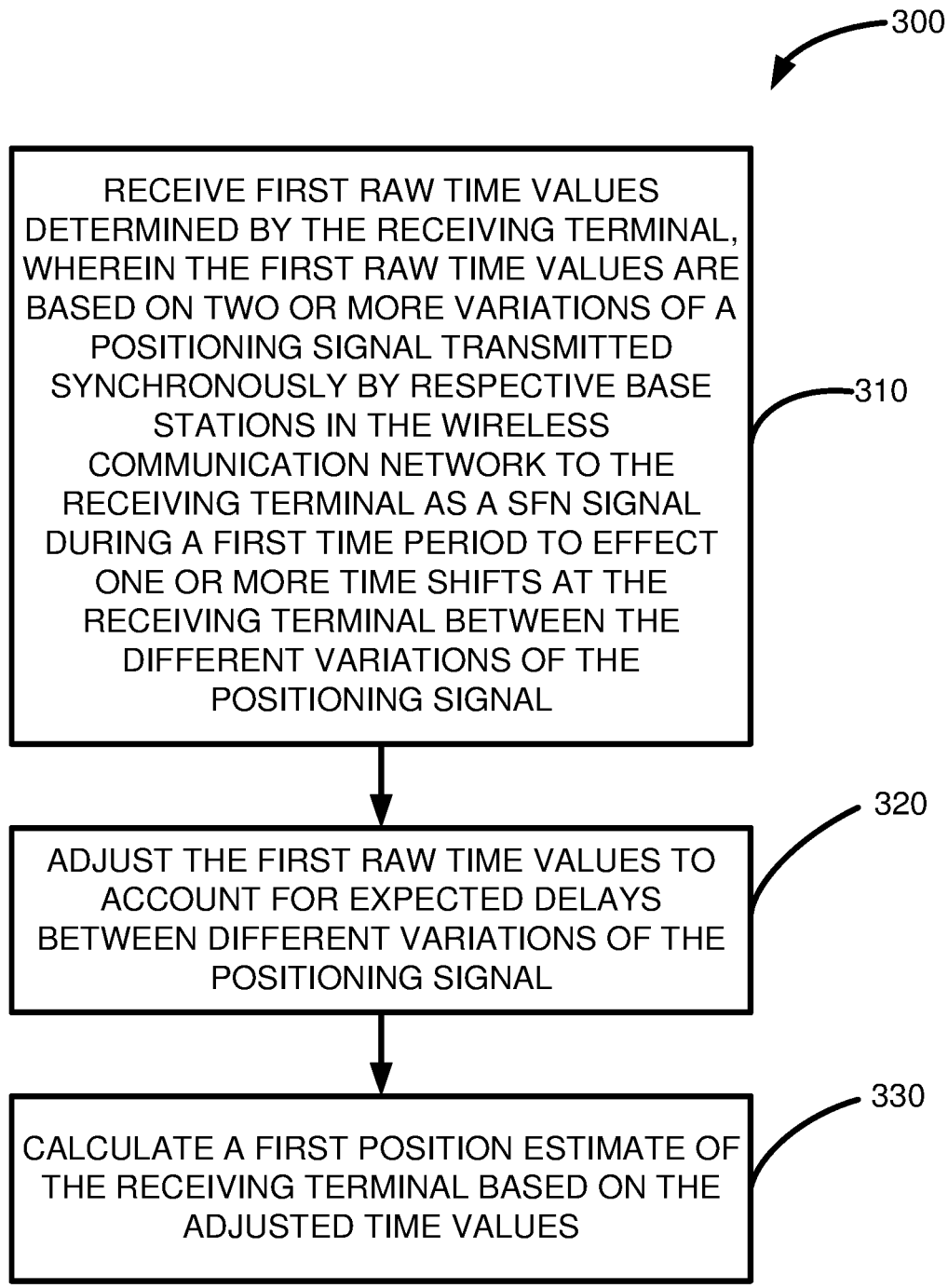
FIG. 8 illustrates a method implemented by a location server of calculating a position of UE or other receiving terminal using time measurements derived from a positioning signal transmitted as an SFN signal.

FIG. 8 illustrates an exemplary method 300 implemented by a positioning node, e.g., location server 40, in the wireless communication network 10. The positioning node, e.g., location server 40, receives first raw time values determined by a receiving terminal, e.g., UE 20 (block 310). The first raw time values are based on two or more variations of a positioning signal, e.g., a common positioning signal shared by two or more base stations 30, transmitted synchronously by respective ones of the two or more base stations in the wireless communication network to the receiving terminal, e.g., UE 20, as an SFN signal during a first time period to effect one or more time shifts at the receiving terminal, e.g., UE 20, between the different ones of the two or more variations of the positioning signal. The positioning node, e.g., location server 40, adjusts the first raw time values to account for the one or more time shifts between the different ones of the two or more variations of the positioning signal (block 320), and calculates a first position estimate of the receiving terminal, e.g., UE 20, based on the adjusted time values (block 330). The adjusted time values may be the adjusted first raw time values.

In some embodiments of the method 300, receiving first raw time values determined by the receiving terminal, e.g., UE 20, comprises receiving time difference of arrival (TDOA) values representing differences in the arrival time between different ones of the two or more variations of the positioning signal transmitted by respective ones of the two or more base stations. The two or more variations of the positioning signal may have been transmitted by respective ones of the two or more base stations 30 during the first time period.

In some embodiments of the method 300, adjusting the first raw time values comprises subtracting, from each TDOA value, a corresponding time shift between different ones of the two or more variations of the positioning signal.

In some embodiments of the method 300, receiving first raw time values determined by the receiving terminal, e.g., UE 20, comprises receiving time of arrival (TOA) values representing arrival times of different ones of the two or more variations of the positioning signal received by the receiving terminal, e.g., UE 20.

In some embodiments of the method 300, adjusting the first raw time values comprises calculating TDOA values between the arrival times of different ones of the two or more variations of the positioning signal based on the TOA values, and subtracting, from each TDOA value, a corresponding time shift between different ones of the two or more variations of the positioning signal.

Some embodiments of the method 300 further comprise receiving second raw time values determined by the receiving terminal, e.g., UE 20, wherein the second raw time values are based on two or more variations of a positioning signal transmitted synchronously by respective ones of the two or more base stations 30 in the wireless communication network to the receiving terminal, e.g., UE 20, as an SFN signal during a second time period to effect one or more time shifts at the receiving terminal, e.g., UE 20, between different ones of the two or more variations of the positioning signal, adjusting the second raw time values to account for the one or more time shifts between the different ones of the two or more variations of the positioning signal, and calculating a second position estimate of the receiving terminal, e.g., UE 20, based on the adjusted time values. The adjusted time values may be the adjusted second raw time values.

In some embodiments of the method 300, receiving second raw time values determined by the receiving terminal, e.g., UE 20, comprises receiving time difference of arrival (TDOA) values representing differences in the arrival time between different ones of the two or more variations of the positioning signal transmitted by respective ones of the two or more base stations. The two or more variations of the positioning signal may have been transmitted by respective ones of the two or more base stations 30 during the second time period.

In some embodiments of the method 300, adjusting the second raw time values comprises subtracting, from each TDOA value, a corresponding time shift between different ones of the two or more variations of the positioning signal.

In some embodiments of the method 300, receiving second raw time values determined by the receiving terminal, e.g., UE 20, comprises receiving time of arrival (TOA) values representing arrival times of different ones of the two or more variations of the positioning signal received by the receiving terminal, e.g., UE 20.

In some embodiments of the method 300, adjusting the second raw time values comprises calculating TDOA values between the arrival times of different ones of the two or more variations of the positioning signal based on the TOA values, and subtracting, from each TDOA value, a corresponding time shift between different ones of the two or more variations of the positioning signal.

In some embodiments of the method 300, a first association between the two or more variations of the positioning signal and respective ones of the two or more base stations 30 is applied in the first time period, and a second association between the two or more variations of the positioning signal and respective ones of the two or more base stations 30 is applied in the second time period.

Some embodiments of the method 300 further comprise generating one or more association hypotheses regarding the respective first and second association between the two or more variations of the positioning signals transmitted in the first and second time period respectively and corresponding ones of the two or more base stations 30, and testing one or more of the association hypotheses to identify the first and second associations.

Some embodiments of the method 300 further comprise using side information to reduce a number of possible association hypotheses to be tested.

In some embodiments of the method 300, testing one or more of the association hypotheses comprises, for each association hypothesis tested, calculating the first position estimate based on the one or more first raw time values and the association hypothesis, calculating the second position estimate based on the second raw time values and the association hypothesis, and verifying the association hypothesis based on a comparison of the first and second position estimates.

Some embodiments of the method 300 further comprise determining a final position estimate based on the first position estimate, the second position estimate, or both responsive to verifying the association hypothesis.

Figure 9B:
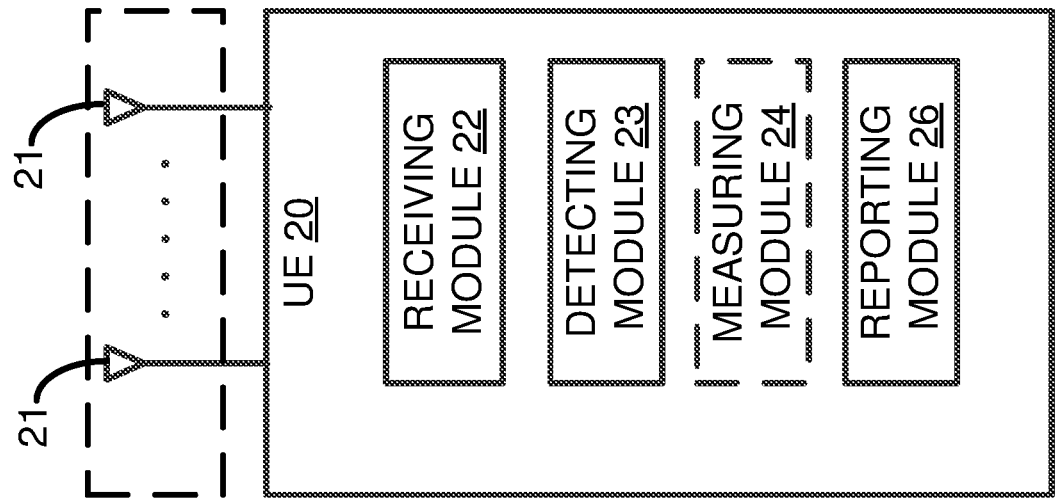
FIGS. 9A and 9B illustrate exemplary UEs or other receiving terminals configured to receive a positioning signal transmitted as an SFN signal.
Figure 9A:
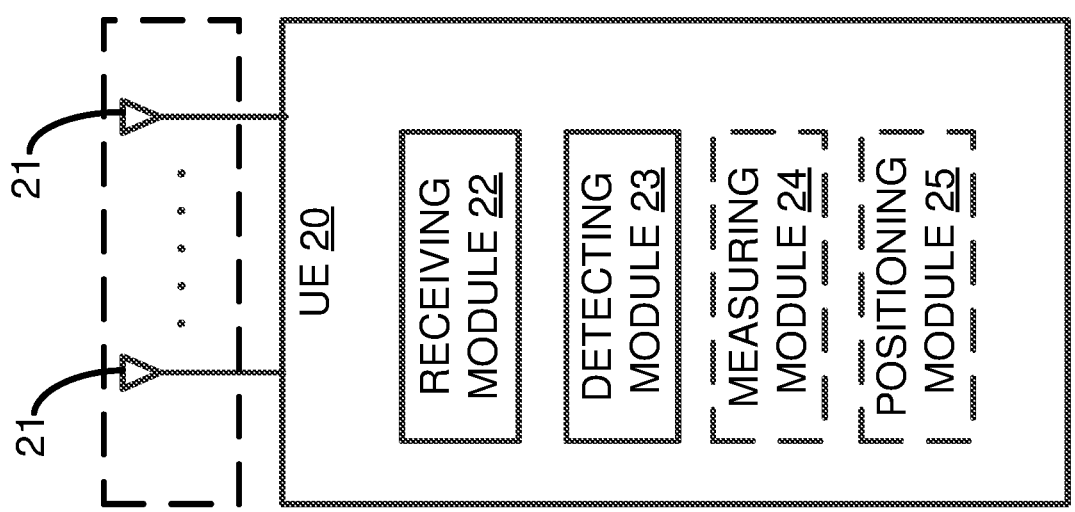

FIGS. 9A and 9B illustrate exemplary UEs 20, being examples of receiving terminals, configured to receive a positioning signal as an SFN signal. The UEs 20 shown in FIGS. 9A and 9B each comprise one or more antennas 21, a receiving module 22 and a detecting module 23. The embodiment shown in FIG. 9A further comprises, optionally, a measuring module 24 and a positioning module 25. The embodiment shown in FIG. 9B further comprises a reporting module 26 and optionally a measuring module 24. The various modules 22-26 can be implemented by hardware and/or by software code that is executed by one or more processors or processing circuits. The receiving module 22 is configured to receive a positioning signal transmitted as an SFN signal by two or more base stations 30 as herein described. The SFN signal comprises a composite of two or more variations of the positioning signal transmitted synchronously by respective ones of the two or more base stations 30 as an SFN signal to effect one or more time shifts at the receiving terminal, e.g., UE 20 between different ones of the variations of the positioning signal. The detecting module 23 is configured to detect time positions of impulses in a first composite channel impulse response of the SFN signal transmitted, where the impulses correspond to the two or more variations of the positioning signal. The measuring module 24, in embodiments where one is present, measures the time difference between the time positions of respective pairs of the impulses to obtain one or more time differences. In the embodiment of FIG. 9A, the positioning module 25 calculates a position estimate for the receiving terminal, e.g., UE 20, based on the one or more time differences and the one or more time shifts. In the embodiment of FIG. 9B, the reporting module 25 reports, to the network, the time positions of the impulses as TOA values or, the time differences determined by the measuring module 24 as TDOA values, in embodiments where a measuring module 24 is present.

Figure 10:
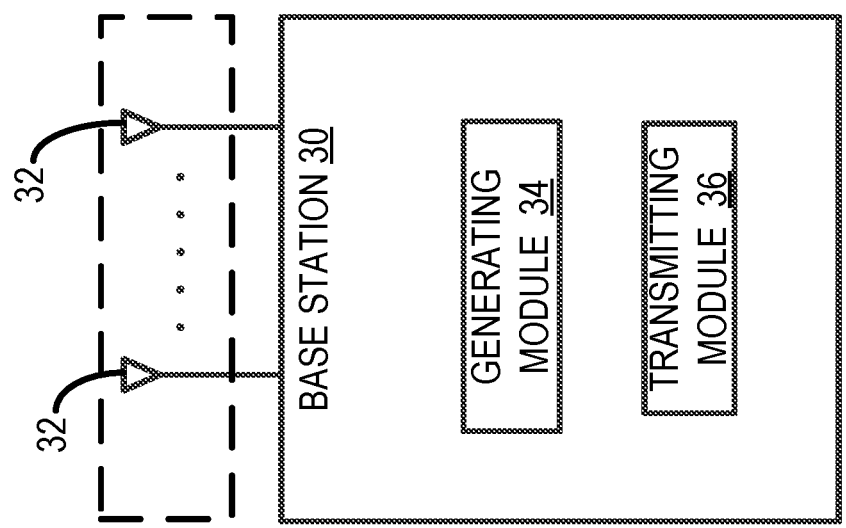
FIG. 10 illustrates a method implemented by a base station or other transmission point of transmitting a positioning signal as an SFN signal.

FIG. 10 illustrates a base station 30 in accordance with one or more embodiments. The base station 30 comprises one or more antennas 32, a generating module 34, and a transmitting module 36. The modules 34 and 36 can be implemented by hardware and/or by software code that is executed by a processor or processing circuit. The generating module 34 is configured to generate a first variation of a positioning signal to be transmitted as an SFN signal to effect one or more time shifts at the receiving terminal, e.g., UE 20, between the first variation of the positioning signal and one or more different variations of the positioning signal transmitted synchronously by one or more other base stations 30. The transmitting module 36 is configured to transmit, as the SFN signal, the first variation of the positioning signal synchronously with the one or more different variations of the positioning signal transmitted by the one or more other base stations 30.

Figure 11:
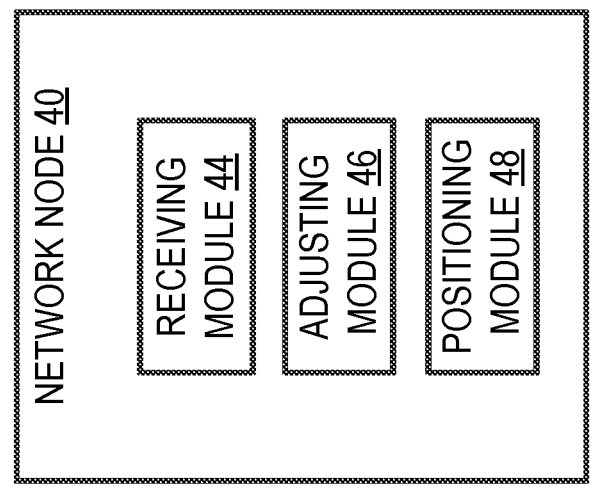
FIG. 11 illustrates a location server configured to calculate a position of UE or other receiving terminal using time measurements derived from a positioning signal transmitted as an SFN signal.

FIG. 11 illustrates a location server or other network node 40, being an example of a positioning node, in accordance with one or more embodiments. The network node 40 comprises a receiving module 44, an adjusting module 46, and a positioning module 48. The modules 44, 46 and 48 can be implemented by hardware and/or by software code that is executed by a processor or processing circuit. The receiving module 42 is configured to receive raw time values (e.g., TOA values or TDOA values) determined by a receiving terminal, e.g., UE 20. The raw time values are based on two or more variations of a positioning signal transmitted synchronously by respective ones of two or more base stations 30 in the wireless communication network to the receiving terminal, e.g., UE 20, as an SFN signal to effect one or more time shifts at the receiving terminal, e.g., UE 20, between the different ones of the two or more variations of the positioning signal. The adjusting module 44 is configured to adjust the raw time values to account for the one or more time shifts between the different ones of the two or more variations of the positioning signal. The positioning module 48 is configured to calculate an estimated position, or position estimate, of the UE 20 based on the adjusted time values. The adjusted time values may be adjusted raw time values.

Figure 12A:
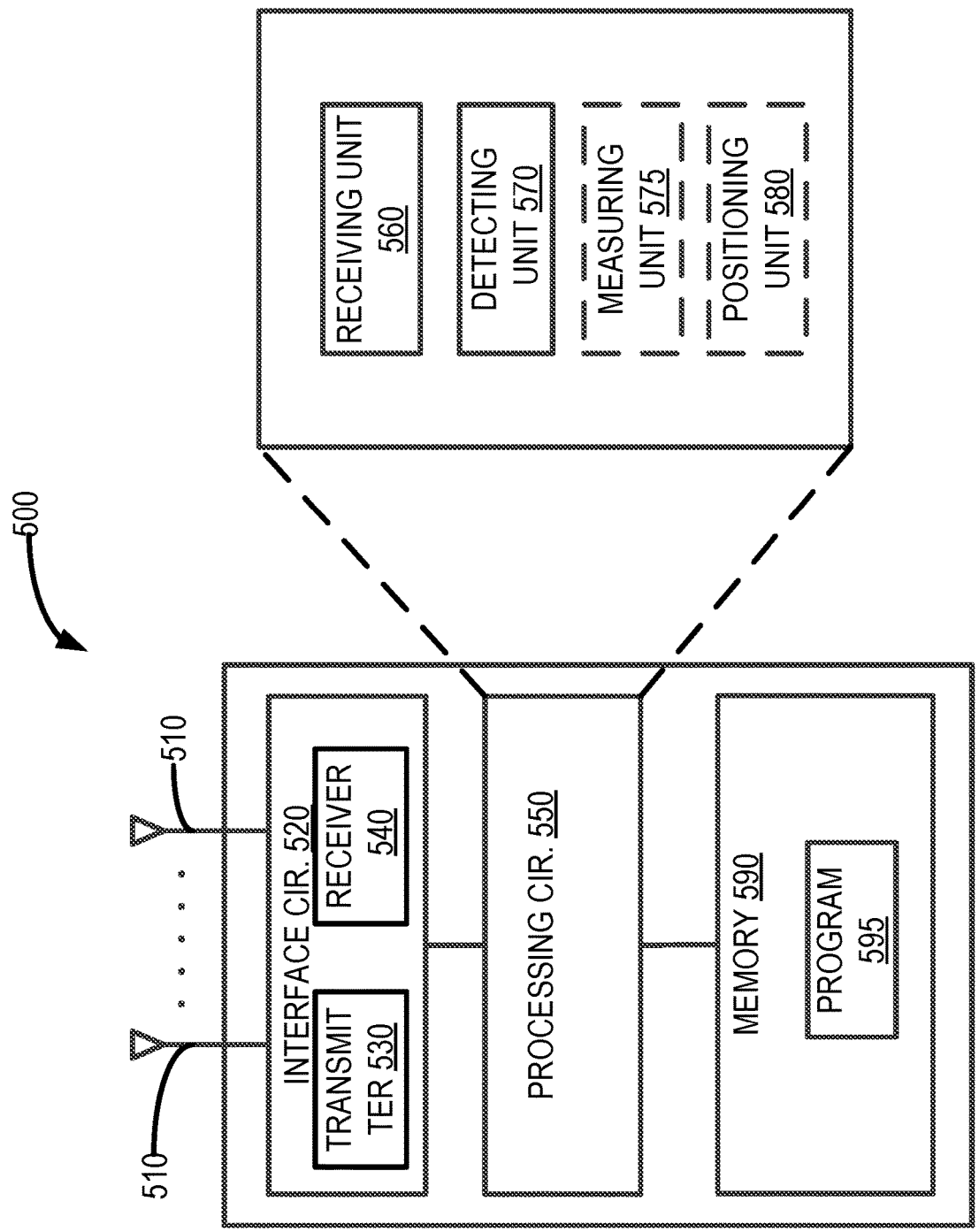
FIGS. 12A and 12B illustrate exemplary UEs or other receiving terminals configured to receive a positioning signal transmitted as an SFN signal.
Figure 12B:
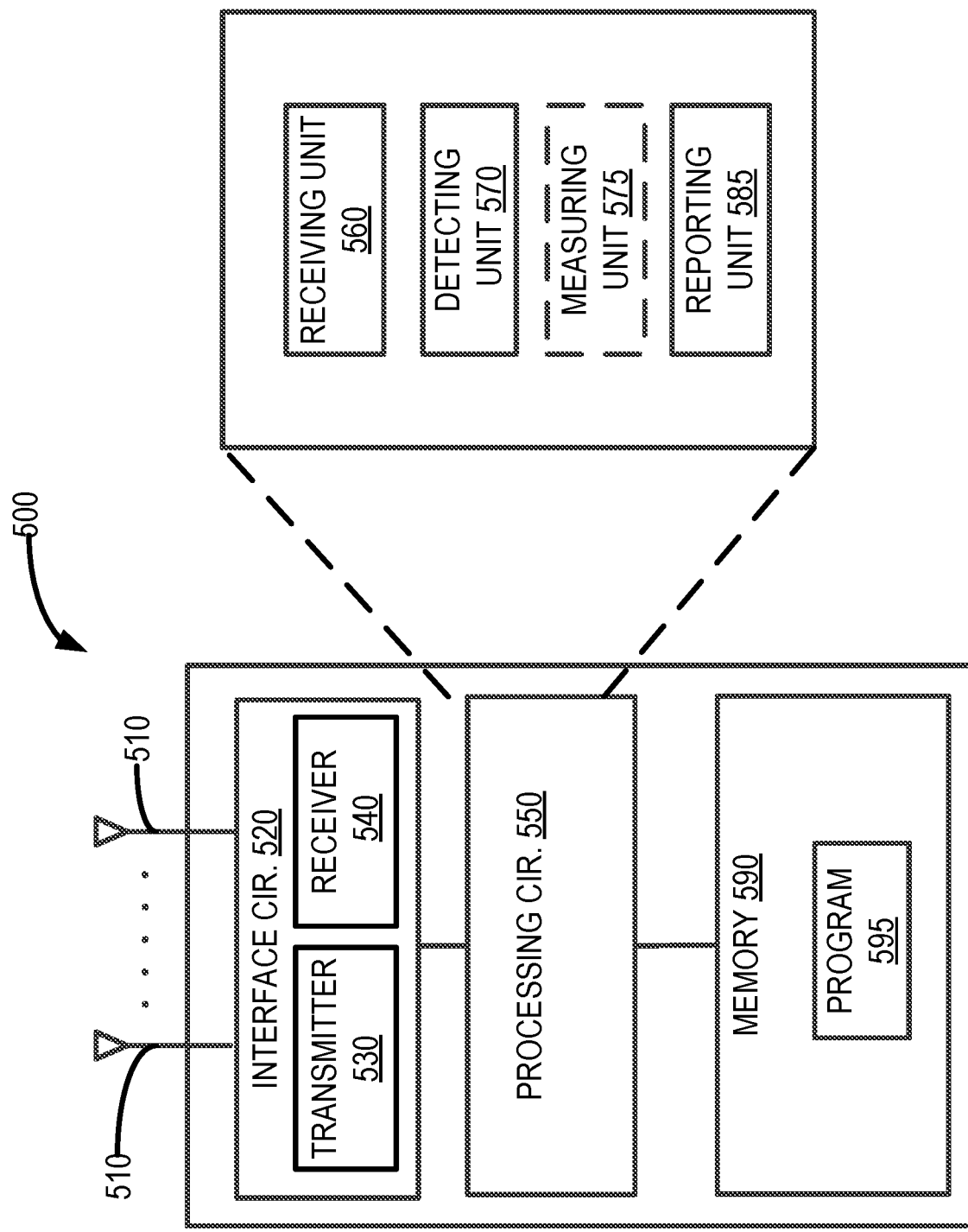

FIGS. 12A and 12B illustrate the main functional elements of a UE 500, being an example of a receiving terminal, according to an embodiment. The UE 500 shown in FIGS. 12A and 12B each comprise one or more antennas 510, an interface circuit 520, a processing circuit 550, and memory 590.

The interface circuit 520 is coupled to the antennas 510 and comprises the radio frequency (RF) circuitry needed for transmitting and receiving signals over a wireless communication channel. For example, the RF circuitry may comprises a transmitter 530 and a receiver 540 configured to operate according to LTE and/or NR standards.

The processing circuit 550 controls the overall operation of the UE 500 and processes the signals transmitted to and/or received by the UE 500. Such processing includes transmit signal processing, receive signal processing, and signaling of control information. The processing circuit 550 may comprise one or more microprocessors, hardware, firmware, or a combination thereof.

The processing circuit 550 comprises a receiving unit 560 and a detecting unit 570. The receiving unit 560 is configured to receive a positioning signal transmitted as an SFN signal by two or more base stations 30 as herein described. The SFN signal comprises a composite of two or more variations of the positioning signal transmitted synchronously by respective ones of the two or more base stations 30 as an SFN signal to effect one or more time shifts at the receiving terminal, e.g., UE 20, between different ones of the two or more variations of the positioning signal. The detecting unit 570 is configured to detect time positions of impulses in a first composite channel impulse response of the SFN signal transmitted, where the impulses correspond to the two or more variations of the positioning signal.

Some embodiments of the processing circuit 550 can further comprise a measuring unit 575 with either a positioning unit 580 (FIG. 12A) or reporting unit 585 (FIG. 12B). The measuring unit 575, in embodiments where one is present, measures time differences between the time positions of respective pairs of the impulses to obtain one or more time differences. The positioning unit 580, in embodiments where one is present, calculates a position estimate for the UE 500 based on the one or more time differences and the one or more time shifts. The reporting unit 585, in embodiments where one is present, reports, to the network, either 1) TOA values corresponding to the time position of detected impulses, or 2) the time differences determined by the measuring unit 575 as TDOA value.

Memory 590 comprises both volatile and non-volatile memory for storing computer program code and data needed by the processing circuit 550 for operation. Memory 590 may comprise any tangible, non-transitory computer-readable storage medium for storing data including electronic, magnetic, optical, electromagnetic, or semiconductor data storage. Memory 590 stores a computer program 595 comprising executable instructions that configure the processing circuit 550 to implement the methods 100 according to FIGS. 6A and 6B as described herein. A computer program 595 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 595 for configuring the processing circuit 550 as herein described may be stored in a removable memory, such as a portable compact disc, portable digital video disc, or other removable media. The computer program 595 may also be embodied in a carrier such as an electronic signal, optical signal, radio signal, or computer readable storage medium.

Figure 13:
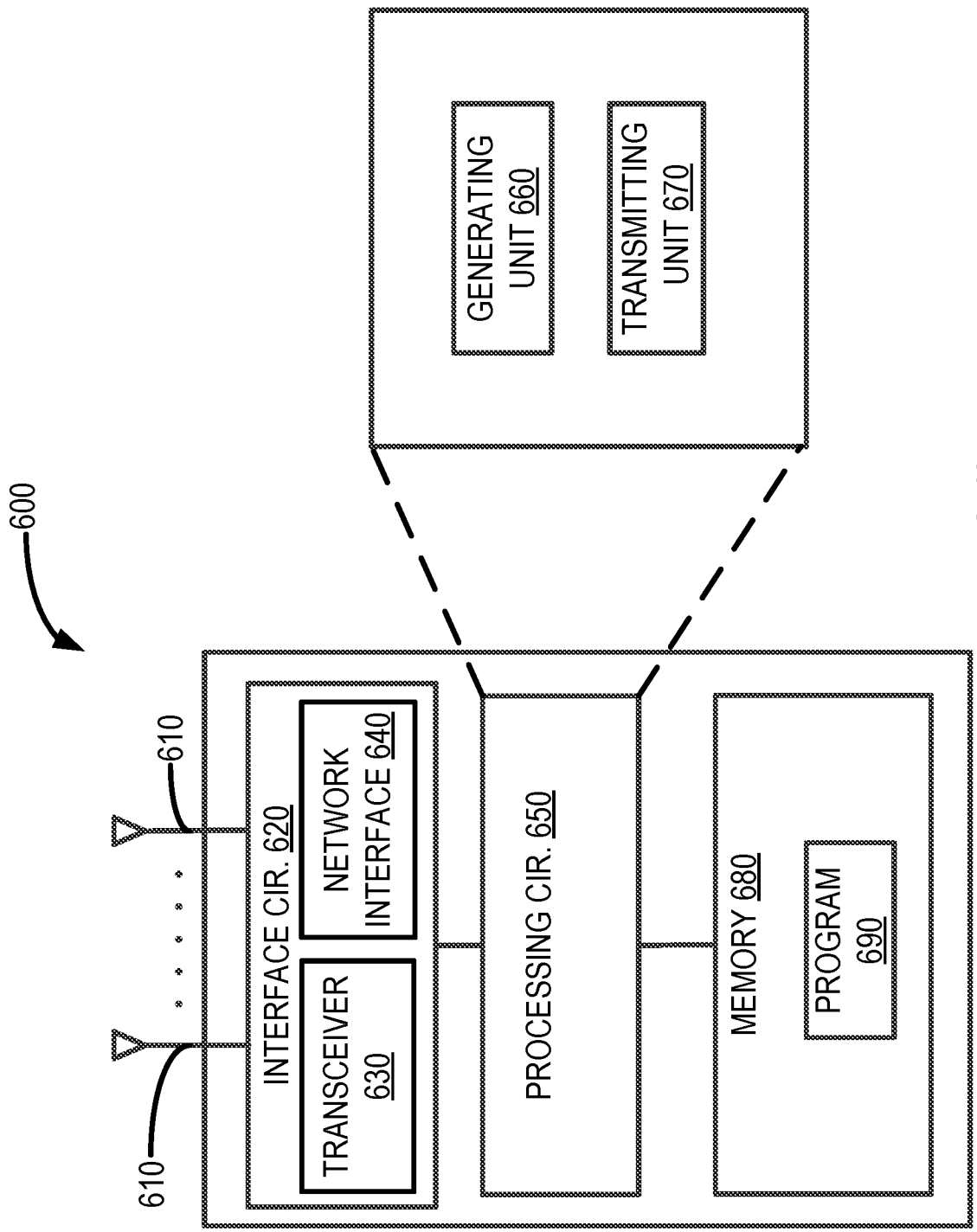
FIG. 13 illustrates a base station or other transmission point configured to transmit a positioning signal as an SFN signal.

FIG. 13 illustrates the main functional elements of a base station 600 according to an embodiment. The base station 600 comprises one or more antennas 610, an interface circuit 620, a processing circuit 650, and memory 680.

The interface circuit 620 comprises an RF transceiver 630 coupled to the antennas 610 and a network interface 640. The RF transceiver 630 comprises the radio frequency (RF) circuitry needed for transmitting and receiving signals over a wireless communication channel. The RF transceiver 630 is configured to operate according to LTE and/or NR standards. The network interface 640 comprises interface circuitry for coupling the base station 600 to a communication network and enables the base station 600 to communicate over the communication network with other network nodes.

The processing circuit 650 controls the overall operation of the base station 600 and processes the signals transmitted to or received by the base station 600. Such processing includes transmit signal processing, receive signal processing, and signaling of control information. The processing circuit 650 may comprise one or more microprocessors, hardware, firmware, or a combination thereof.

The processing circuit 650 in one embodiment comprises a generating unit 660 and a transmitting unit 670. The generating unit 660 is configured to generate a first variation of a positioning signal to be transmitted as an SFN signal to effect one or more time shifts at a receiving terminal, e.g., UE 20, between the first variation of the positioning signal and one or more different variations of the positioning signal transmitted synchronously by one or more other base stations 30, 600. The transmitting unit 670 is configured to transmit, as an SFN signal, the first variation of the positioning signal synchronously with the one or more different variations of the positioning signal transmitted by the one or more other base stations 30, 600.

Memory 680 comprises both volatile and non-volatile memory for storing computer program code and data needed by the processing circuit 650 for operation. Memory 680 may comprise any tangible, non-transitory computer-readable storage medium for storing data including electronic, magnetic, optical, electromagnetic, or semiconductor data storage. Memory 680 stores a computer program 690 comprising executable instructions that configure the processing circuit 650 to implement the methods 200 according to FIG. 7 as described herein. A computer program 690 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 690 for configuring the processing circuit 650 as herein described may be stored in a removable memory, such as a portable compact disc, portable digital video disc, or other removable media. The computer program 690 may also be embodied in a carrier such as an electronic signal, optical signal, radio signal, or computer readable storage medium.

Figure 14:
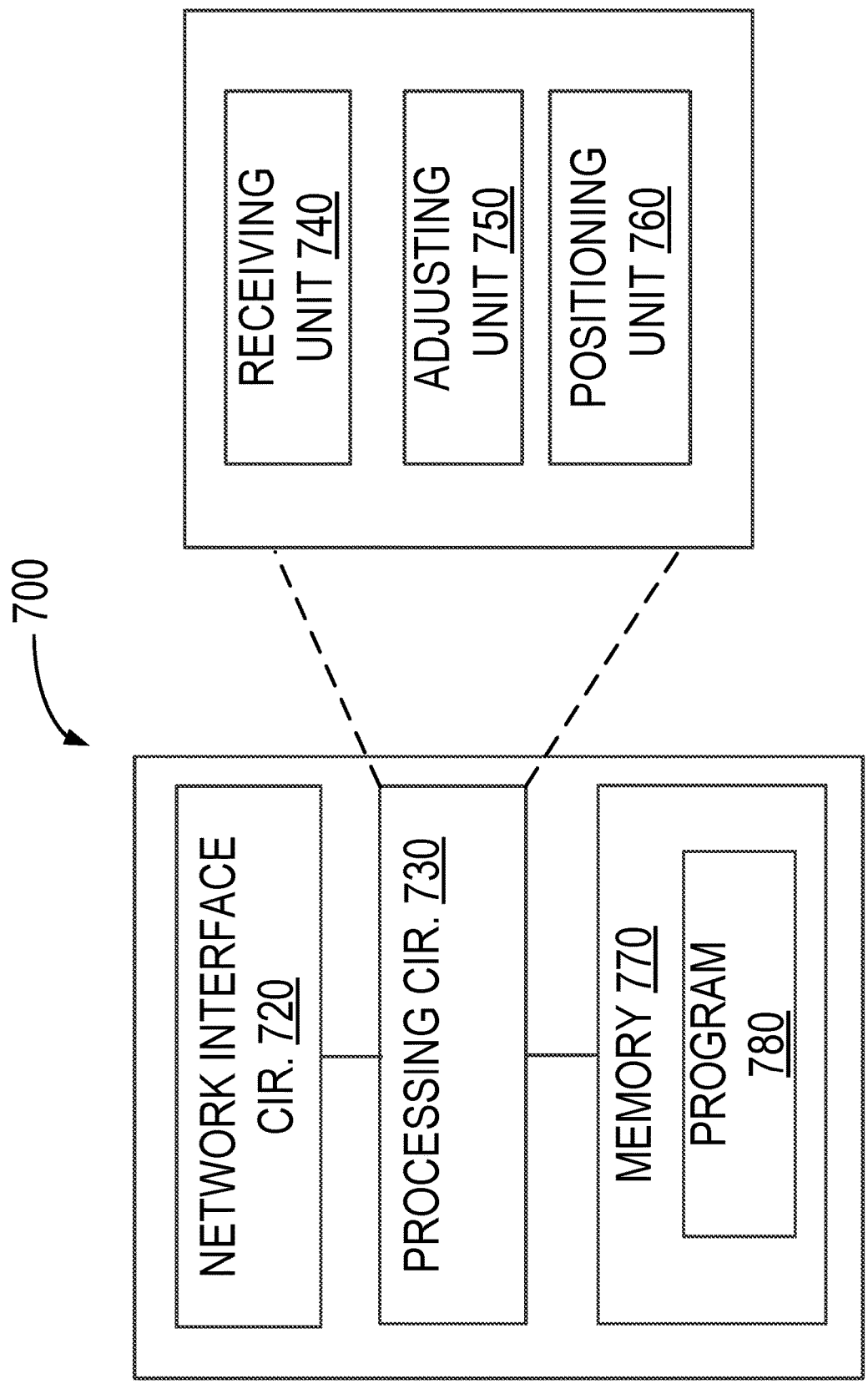
FIG. 14 illustrates a location server or other network node configured to calculate a position of UE or other receiving terminal using time values derived from a positioning signal transmitted as an SFN signal.

FIG. 14 illustrates the main functional elements of a network node 700 configured to function as a location server 40, being an example of a positioning node. The network node 700 comprises a network interface 720, a processing circuit 730, and memory 770.

The network interface 720 comprises circuitry for coupling the network node 700 to a communication network 10 and enables the network node 700 to communicate over the communication network 10 with the base stations 30, 600 and other network nodes.

The processing circuit 730 controls the overall operation of the network node 700 and processes the signals transmitted to or received by the network node 700. Such processing includes transmit signal processing, receive signal processing, and signaling of control information. The processing circuit 730 may comprise one or more microprocessors, hardware, firmware, or a combination thereof.

The processing circuit 730 in one embodiment comprises a receiving unit 740, an adjusting unit 750, and a positioning unit 760. The receiving unit 740 is configured to receive raw time values determined by a receiving terminal, e.g., UE 20. The raw time values are based on two or more variations of a positioning signal transmitted synchronously by respective ones of two or more base stations 30 in the wireless communication network to the receiving terminal, e.g., UE 20, as an SFN signal to effect one or more time shifts at the receiving terminal, e.g., UE 20, between the different ones of the two or more variations of the positioning signal. The adjusting unit 750 is configured to adjust the raw time values to account for the one or more time shifts between the different ones of the two or more variations of the positioning signal. The positioning unit 760 is configured to calculate an estimated position, or position estimate, of the receiving terminal, e.g., UE 20, based on the adjusted time values. The adjusted time values may be adjusted raw time values.

Memory 770 comprises both volatile and non-volatile memory for storing computer program code and data needed by the processing circuit 730 for operation. Memory 770 may comprise any tangible, non-transitory computer-readable storage medium for storing data including electronic, magnetic, optical, electromagnetic, or semiconductor data storage. Memory 770 stores a computer program 780 comprising executable instructions that configure the processing circuit 730 to implement the methods 300 according to FIG. 8 as described herein. A computer program in this regard may comprise one or more code modules corresponding to the means or units described above. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 780 for configuring the processing circuit 730 as herein described may be stored in a removable memory, such as a portable compact disc, portable digital video disc, or other removable media. The computer program 780 may also be embodied in a carrier such as an electronic signal, optical signal, radio signal, or computer readable storage medium.

The OTDOA techniques as herein described provide a number of advantages including:

OTDOA estimation (potentially) uncorrupted by interference, which allows for position estimation with better accuracy for a given PRS overhead.

No interference (zero) for received PRS signals within the CP (but non-orthogonal LTE-PRS signals are fully interfering)

The power received from weak (with negative SIR) non-orthogonal PRSs, can potentially be positively used for positioning without interference, to the extent the corresponding impulses can be detected and associated with the right base stations.

Especially in high SINR conditions such impulses may more easily be detected and may significantly help.

PRSs with a lower reuse factor, down to reuse-1, may be used, which allows for more interference filtering, which improves positioning accuracy.

The availability of potentially all REs for positioning a high degree of low-pass filtering in time and frequency is possible, which increases the SINR. For SINR this may be compensated for partly by using REs with increased energy ("boosting") but for SINR such boosting has no effect since also interfering REs are boosted equally. However, low-pass filtering increases SIR with about the same amount as the reuse factor. Compared to reuse-6 (LTE-PRS) an SIR gain of 10*log 10(6)=7.8 dB may be expected.

Received positioning signals, with time delays beyond the length of the cyclic prefix, but within the full symbol time length $T_U$, (in LTE $T_U$=66.666 . . . μs, corresponding to 20 km), are partly constructive and only partially interfering, with a graceful increase of interference from fully constructive/no interference, at the edge of the CP, to no constructive/fully interfering at the edge of the symbol time TU.

The OTDOA positioning technique can be used for positioning without dedicated PRSs, just Cell-Specific Reference Sequences (CRS) together with normal user data, which lowers transmission overhead.

Use of data signals for positioning allows for a very high degree of noise- and interference filtering thanks to the potentially large amounts of data received, which in turn may allow for a higher accuracy of the positioning. Assuming, e.g., a factor 26=64 times more broadcast data REs than PRS REs for positioning additional low-pass filtering of the channel estimate/CIR may allow for about 6*3 dB=18 dB improvement in SINR (provided the signal can be decoded).

The proposed OTDOA positioning techniques may be applied as an extension to the LTE-PRS, e.g., by keeping the existing reuse-6 PRS patterns, adding cyclic shifts but not using the Gold code.

Figure 15:
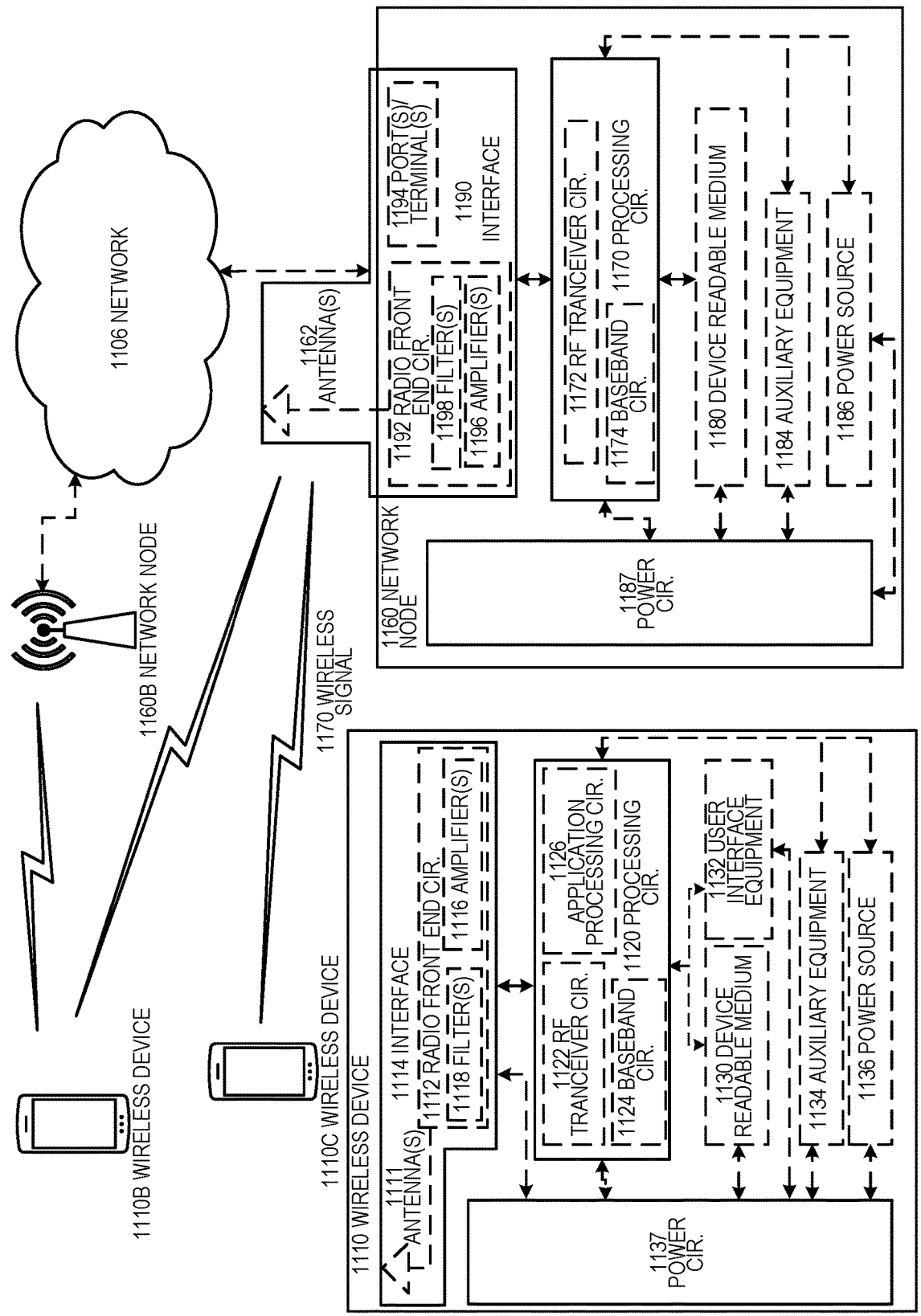
FIG. 15 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 15 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136.

Power circuitry 1137 may perform any formatting, converting, or other modification to the power from power source 1136 to make the power suitable for the respective components of WD 1110 to which power is supplied.

Figure 16:
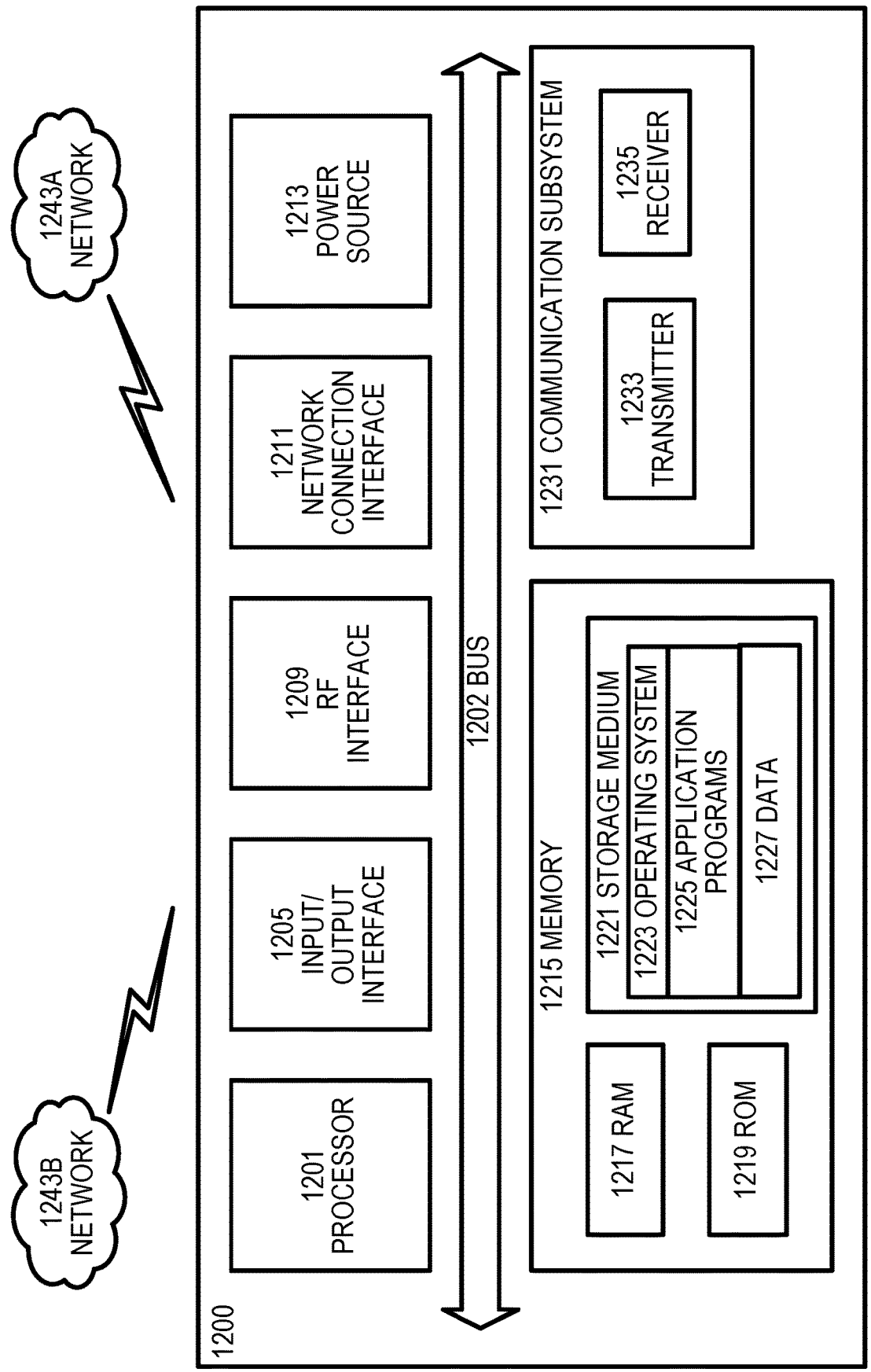
FIG. 16 is a schematic block diagram illustrating an example of a user equipment, according to particular embodiments of the present disclosure.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS)

optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 16, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 17:
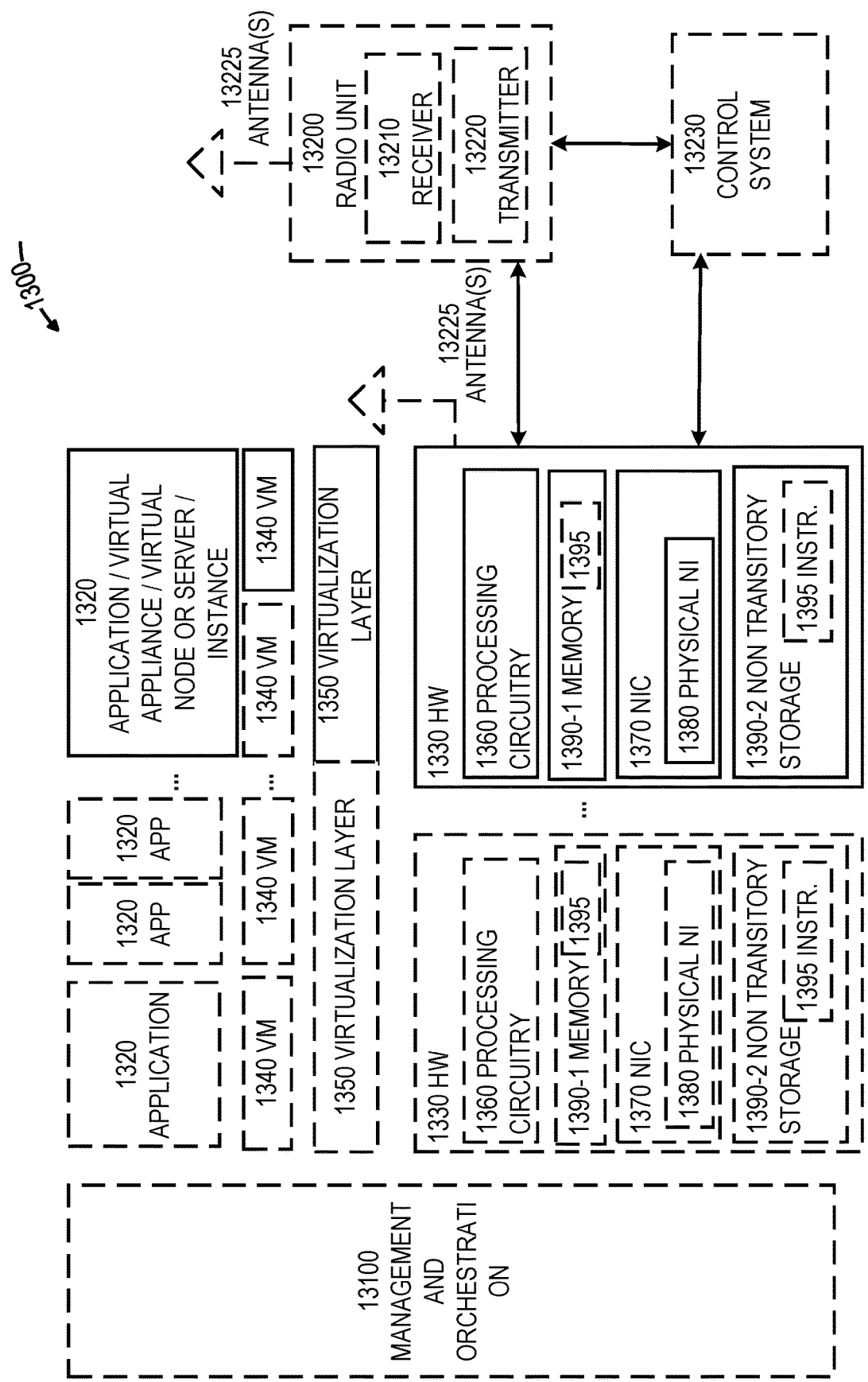
FIG. 17 is a schematic block diagram illustrating an example of a virtualization environment, according to particular embodiments of the present disclosure.

FIG. 17 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 17, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 17.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 18:
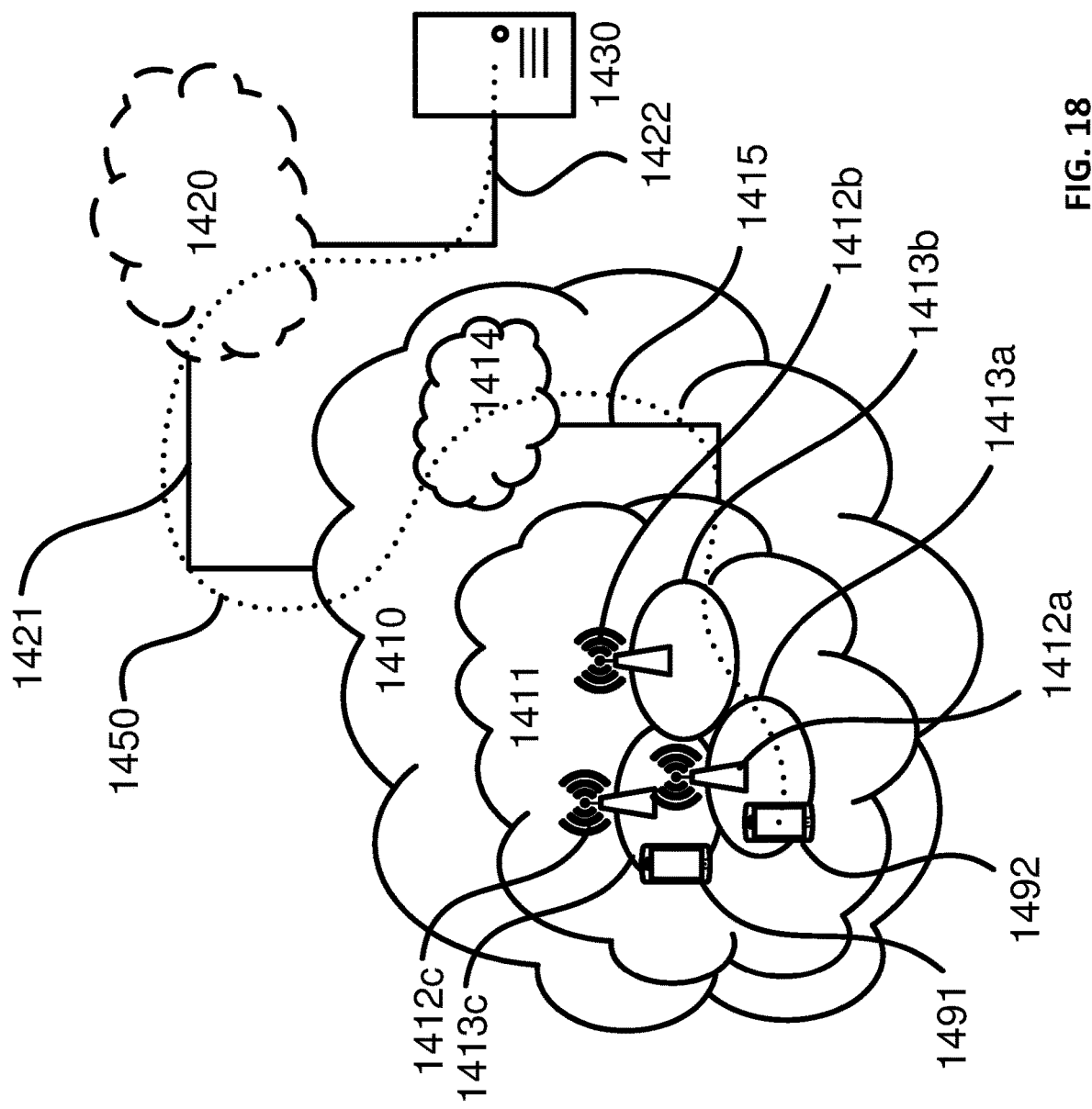
FIG. 18 is a schematic illustrating an example telecommunication network, according to particular embodiments of the present disclosure.

FIG. 18 illustrates a telecommunication network connected via an intermediate network to a host computer in accordance with some embodiments. In particular, with reference to FIG. 18, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 18 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 19:
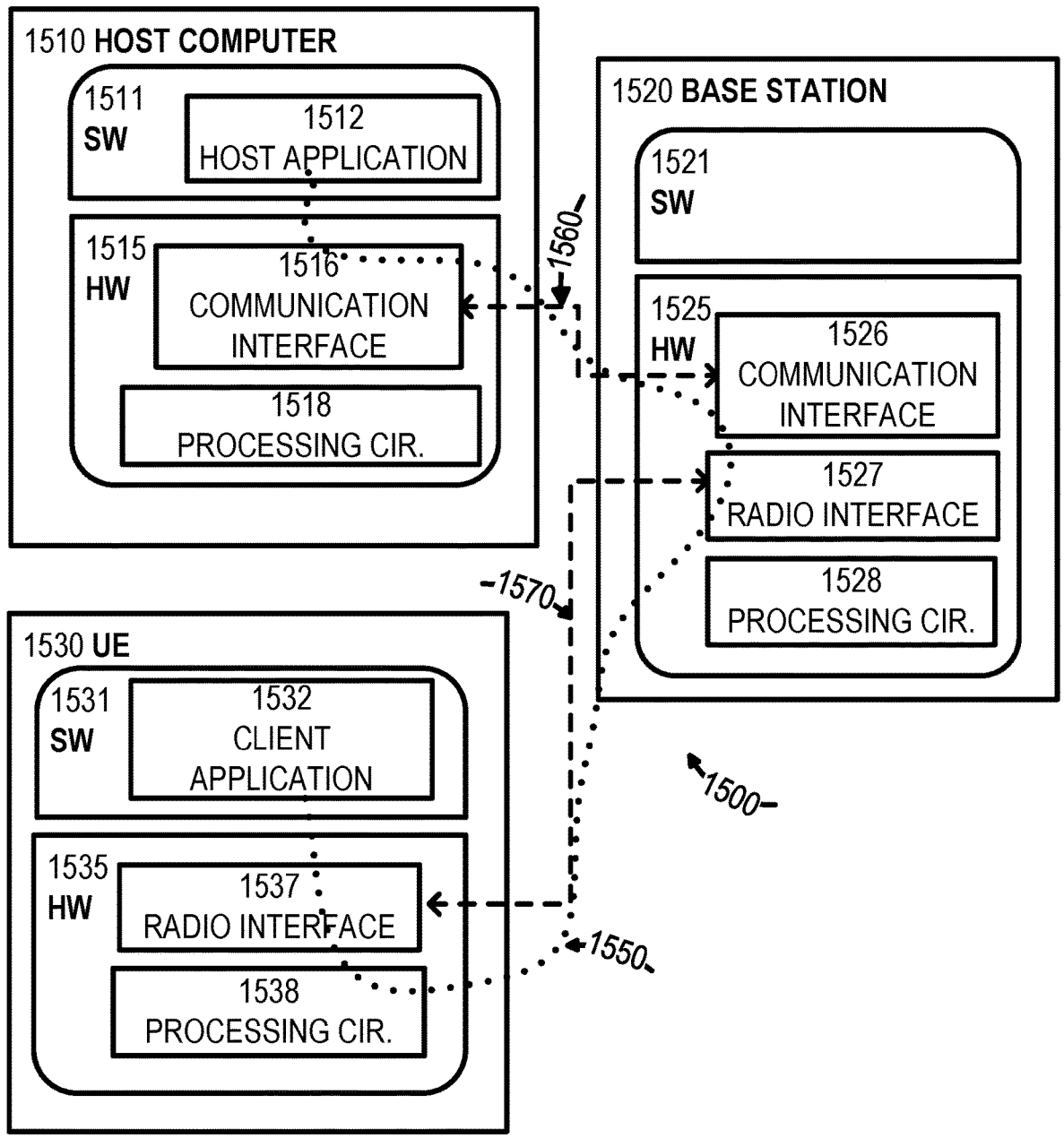
FIG. 19 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 19) served by base station 1520. Communication interface 1526 may be configured to facilitate connection 1560 to host computer 1510. Connection 1560 may be direct or it may pass through a core network (not shown in FIG. 19) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 19 may be similar or identical to host computer 1430, one of base stations 1412a, 1412b, 1412c and one of UEs 1491, 1492 of FIG. 18, respectively. This is to say, the inner workings of these entities may be as shown in FIG. 19 and independently, the surrounding network topology may be that of FIG. 18.

In FIG. 19, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the accuracy of position estimation and provide benefits such more reliable location-based services.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 20:
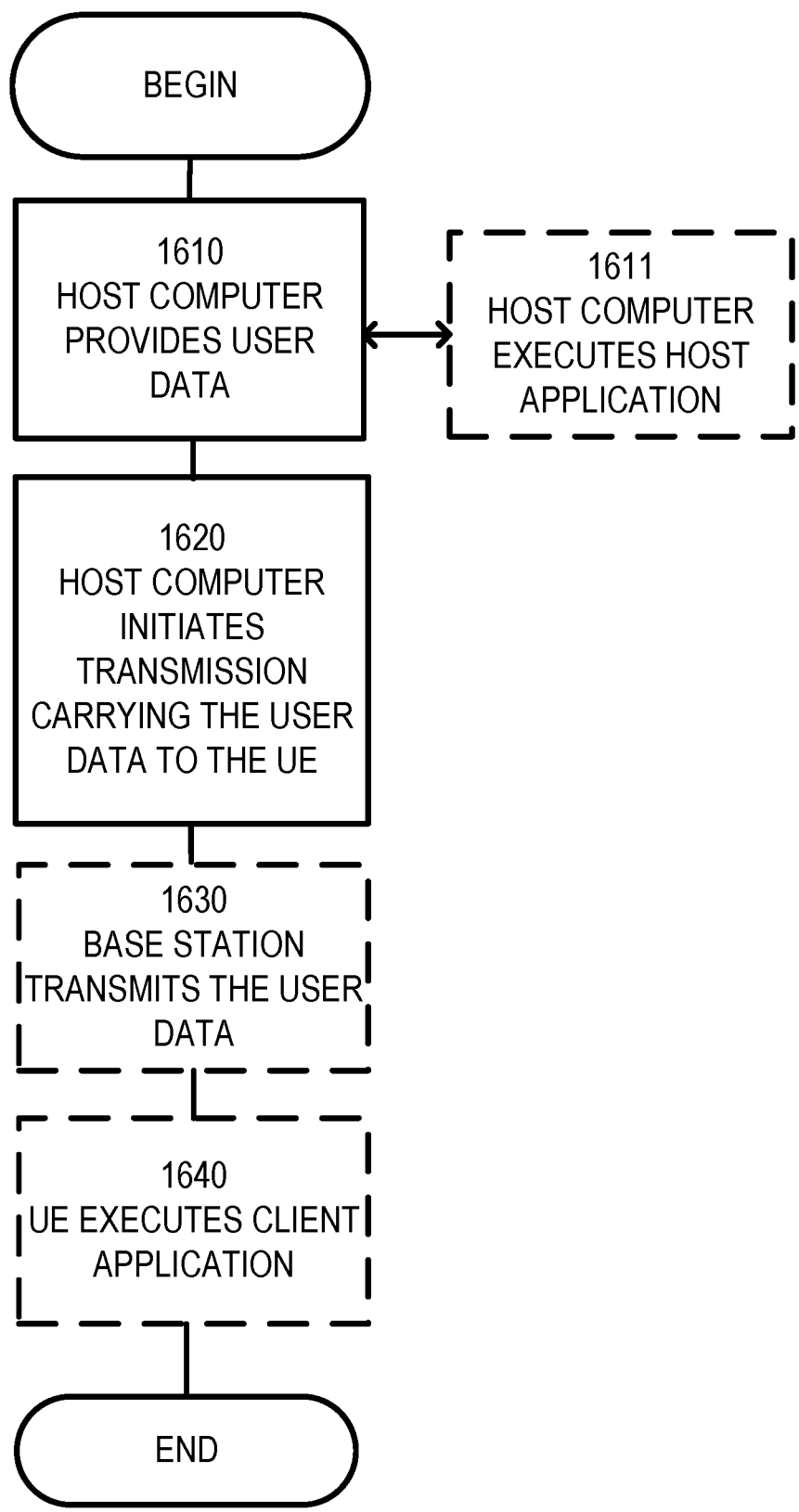
FIGS. 20-23 are flow diagrams, each of which illustrates an example method implemented in a communication system, according to particular embodiments of the present disclosure.

FIG. 20 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 20 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 21:
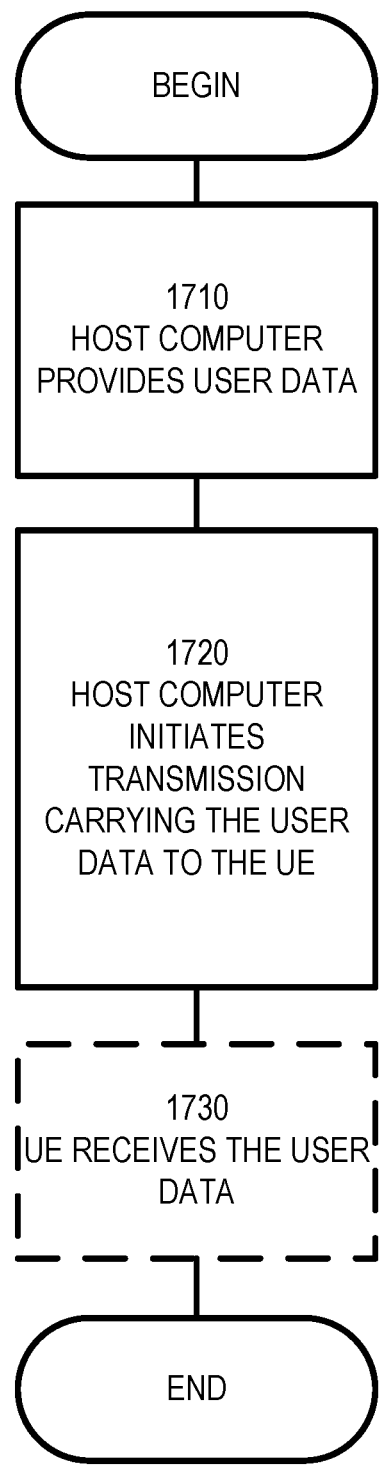

FIG. 21 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 21 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 22:
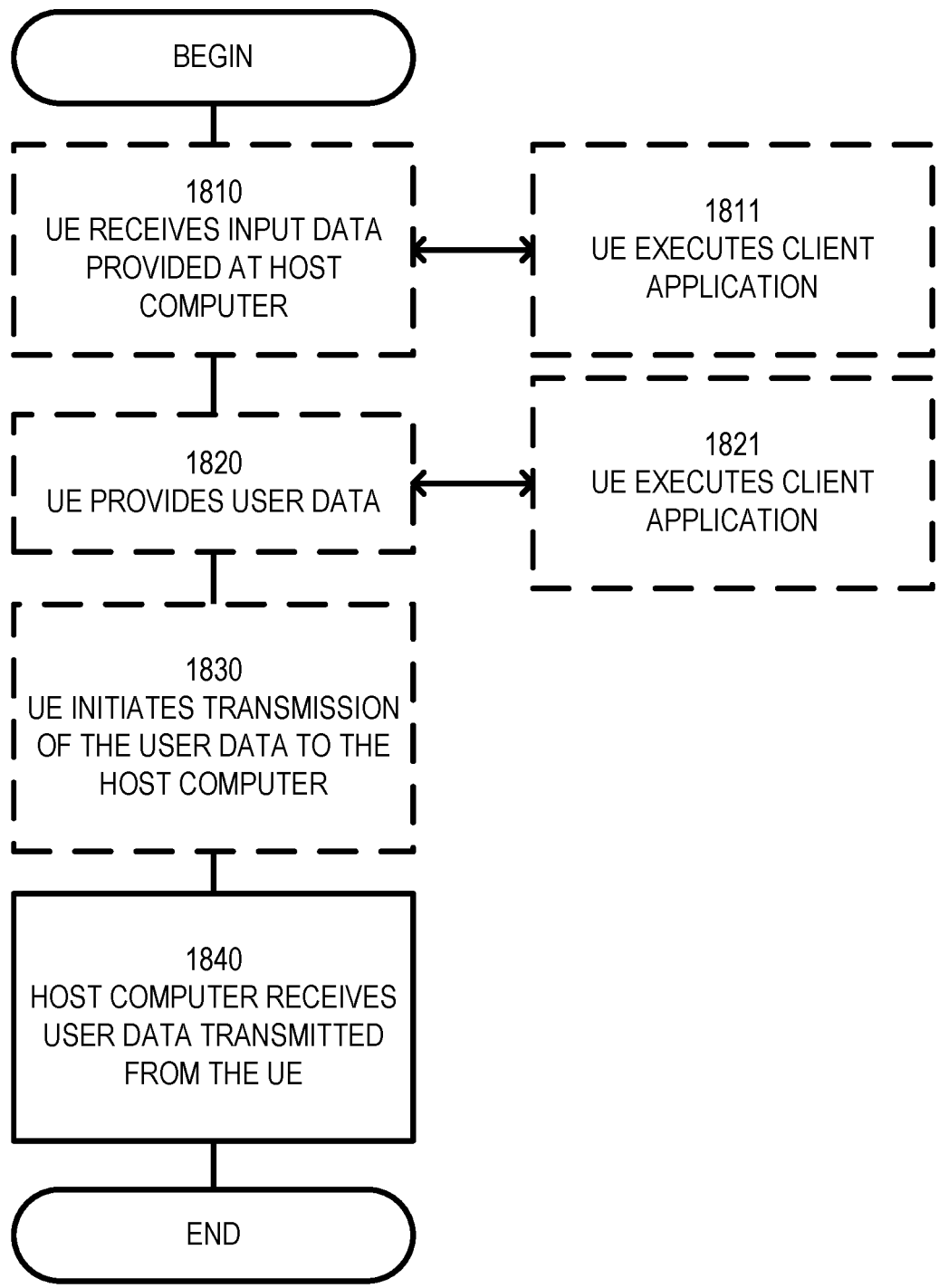

FIG. 22 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 22 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 23:
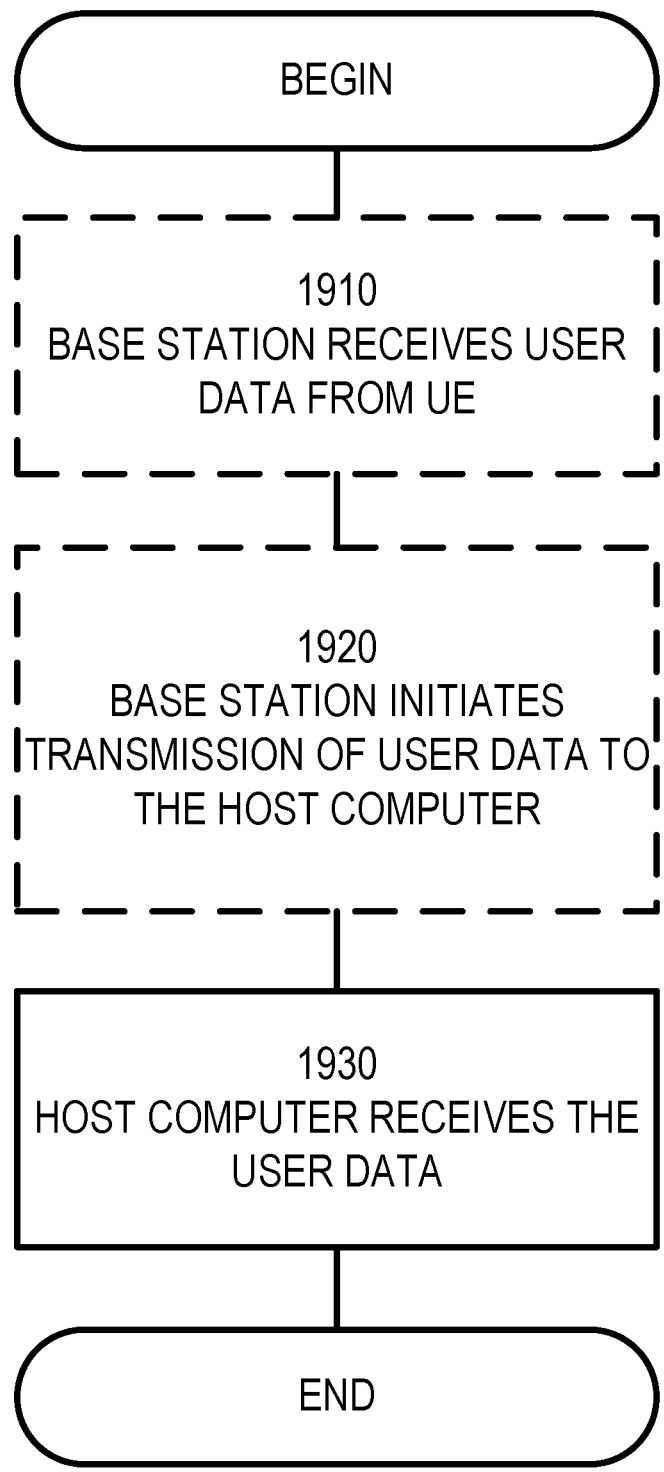

FIG. 23 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 23 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Embodiments of the present disclosure may additionally or alternatively include any compatible combination of features described herein. Indeed, the present invention may be carried out in ways other than those specifically set forth herein without departing from essential characteristics of the invention. The present embodiments are to be considered in all respects as illustrative and not restrictive, and all changes coming within the meaning and equivalency range of the appended claims are intended to be embraced therein. For example, although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

Appendix A attached hereto and incorporated herein by reference describes additional embodiments and provides further details regarding the OTDOA positioning techniques.

Embodiments of the present disclosure may additionally or alternatively include any compatible combination of features described herein. Indeed, the present invention may be carried out in ways other than those specifically set forth herein without departing from essential characteristics of the invention. The present embodiments are to be considered in all respects as illustrative and not restrictive, and all changes coming within the meaning and equivalency range of the appended claims are intended to be embraced therein. For example, although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A method, implemented by a receiving terminal, of receiving a positioning signal transmitted by two or more base stations, the method comprising the receiving terminal:
   receiving, in a first time period, two or more variations of the positioning signal, the two or more variations of the positioning signal being transmitted synchronously by respective ones of the two or more base stations as a single frequency network (SFN) signal to effect one or more time shifts at the receiving terminal between different ones of the variations of the positioning signal; and
   detecting time positions of impulses in a first composite channel impulse response of the SFN signal transmitted in the first time period, the impulses corresponding to the two or more variations of the positioning signal.

2. The method of claim 1, further comprising determining a time difference between the time positions for each of one or more pairs of the impulses in the first composite channel impulse response to obtain one or more first time differences.

3. The method of claim 2, further comprising calculating a first position estimate for the receiving terminal based on the one or more first time differences and the one or more time shifts between the different ones of the variations of the positioning signal received in the first time period.

4. The method of claim 1, wherein the first composite channel impulse response of the SFN signal transmitted in the first time period is determined by correlating the SFN signal received in the first time period with the positioning signal to obtain the first composite channel impulse response.

5. The method of claim 1, further comprising:
   receiving, in a second time period, two or more variations of the positioning signal; the two or more variations of the positioning signal being transmitted synchronously by respective ones of the two or more base stations as an SFN signal to effect one or more time shifts at the receiving terminal between different ones of the two or more variations of the positioning signal;
   detecting time positions of impulses in a second composite channel impulse response of the SFN signal transmitted in the second time period, the impulses corresponding to the two or more variations of the positioning signal.

6. The method of claim 5, further comprising determining a time difference between the time positions for each of one or more pairs of the impulses in the second composite channel impulse response to obtain one or more second time differences.

7. The method of claim 6, further comprising calculating a second position estimate for the receiving terminal based on the one or more second time differences and the one or more time shifts between the different ones of the variations of the positioning signal received in the second time period.

8. The method of claim 7:
   further comprising determining a time difference between the time positions for each of one or more pairs of the impulses in the first composite channel impulse response to obtain one or more first time differences;
   further comprising calculating a first position estimate for the receiving terminal based on the one or more first time differences and the one or more time shifts between the different ones of the variations of the positioning signal received in the first time period;
   wherein a first association between the two or more variations of the positioning signal and respective ones of the two or more base stations is applied in the first time period; and
   a second association between the two or more variations of the positioning signal and respective ones of the two or more base stations is applied in the second time period.

9. The method of claim of claim 7, further comprising:
   determining a time difference between the time positions for each of one or more pairs of the impulses in the first composite channel impulse response to obtain one or more first time differences;
   calculating a first position estimate for the receiving terminal based on the one or more first time differences and the one or more time shifts between the different ones of the variations of the positioning signal received in the first time period;
   determining a coarse position estimate based on the first position estimate, the second position estimate, or both; and
   refining the coarse position estimate based on an SFN broadcast signal to obtain a fine position estimate.

10. The method of claim 5, further comprising reporting the time positions of the impulses in the first composite channel impulse response, the second composite channel impulse response, or both, as time of arrival measurements.

11. The method of claim 1, further comprising receiving, from at least one of the two or more base stations, an indication that the positioning signal is being transmitted as an SFN signal.

12. A method, implemented by a base station in a wireless communication network, of transmitting a positioning signal for use in determining a position of a receiving terminal, the method comprising the base station:
   generating a first variation of the positioning signal to be transmitted as a single frequency network (SFN) signal to effect one or more time shifts at the receiving terminal between the first variation of the positioning signal and one or more different variations of the positioning signal transmitted synchronously by one or more other base stations; and
   transmitting, in a first time period as the SFN signal, the first variation of the positioning signal synchronously with the one or more different variations of the positioning signal transmitted by the one or more other base stations.

13. The method of claim 12, wherein generating the first variation of the positioning signal comprises applying, in a time domain, a first cyclic shift to the positioning signal.

14. The method of claim 12, wherein generating the first variation of the positioning signal comprises applying, in a frequency domain, a first linear phase shift to the positioning signal.

15. The method of claim 12, wherein the method comprises transmitting the first variation of the positioning signal on less than all available resource elements in the first time period.

16. The method of claim 12, further comprising:
generating a second variation of the positioning signal to be transmitted as an SFN signal to effect one or more time shifts at the receiving terminal between the second variation of the positioning signal and one or more different variations, including the first variation, of the positioning signal transmitted synchronously by the one or more other base stations; and
transmitting, in a second time period as an SFN signal, the second variation of the positioning signal synchronously with the one or more different variations of the positioning signal transmitted by the other base stations.

17. The method of claim 12, wherein the method comprises the base station muting transmission of the positioning signal in one or more time periods.

18. The method of claim 12, further comprising sending, to the receiving terminal, an indication that the positioning signal is being transmitted as an SFN signal.

19. A receiving terminal for a wireless communication network, the receiving terminal comprising:
interface circuitry configured for communication with the wireless communication network; and
processing circuitry operatively coupled to the interface circuitry and configured to:
receive, in a first time period, two or more variations of the positioning signal, the two or more variations of the positioning signal being transmitted synchronously by respective ones of two or more base stations as a single frequency network (SFN) signal to effect one or more time shifts at the receiving terminal between different ones of the variations of the positioning signal; and
detect time positions of impulses in a first composite channel impulse response of the SFN signal transmitted in the first time period, the impulses corresponding to the two or more variations of the positioning signal.

20. A base station for a wireless communication network, the base station comprising:
interface circuitry configured for communication with a receiving terminal in the wireless communication network; and
processing circuitry operatively coupled to the interface circuitry and configured to:
generate a first variation of a positioning signal to be transmitted as a single frequency network (SFN) signal to effect one or more time shifts at the receiving terminal between the first variation of the positioning signal and one or more different variations of the positioning signal transmitted synchronously by one or more other base stations; and
transmit, in a first time period as the SFN signal, the first variation of the positioning signal synchronously with the one or more different variations of the positioning signal transmitted by the one or more other base stations.

* * * * *